United States Patent
Kataoka

(10) Patent No.: US 9,501,557 B2
(45) Date of Patent: Nov. 22, 2016

(54) INFORMATION GENERATING COMPUTER PRODUCT, APPARATUS, AND METHOD; AND INFORMATION SEARCH COMPUTER PRODUCT, APPARATUS, AND METHOD

(71) Applicant: FUJITSU LIMITED, Kawasaki-shi, Kanagawa (JP)

(72) Inventor: Masahiro Kataoka, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 729 days.

(21) Appl. No.: 13/686,228

(22) Filed: Nov. 27, 2012

(65) Prior Publication Data

US 2013/0086086 A1 Apr. 4, 2013

Related U.S. Application Data

(63) Continuation of application No. PCT/JP2010/059150, filed on May 28, 2010.

(51) Int. Cl.
| | |
|---|---|
| *G06F 7/00* | (2006.01) |
| *G06F 17/30* | (2006.01) |
| G06F 17/00 | (2006.01) |

(52) U.S. Cl.
CPC ... *G06F 17/30616* (2013.01); *G06F 17/30312* (2013.01); *G06F 17/30321* (2013.01); *G06F 17/30324* (2013.01)

(58) Field of Classification Search
CPC .............. G06F 17/30312; G06F 17/30324; G06F 17/30321; G06F 17/30616
See application file for complete search history.

(56) References Cited

U.S. PATENT DOCUMENTS

| | | | |
|---|---|---|---|
| 5,469,354 | A | 11/1995 | Hatakeyama et al. |
| 6,094,647 | A | 7/2000 | Kato et al. |
| 7,149,748 | B1 | 12/2006 | Stephan |
| 2002/0129012 | A1 | 9/2002 | Green |
| 2008/0098024 | A1 | 4/2008 | Kataoka et al. |
| 2009/0193020 | A1 | 7/2009 | Kataoka et al. |

FOREIGN PATENT DOCUMENTS

| | | |
|---|---|---|
| EP | 1557771 A2 | 7/2005 |
| JP | 1-181329 | 7/1989 |

(Continued)

OTHER PUBLICATIONS

"Natural Language Analysis for Semantic Document Modeling" Terje Brasethvik & Jon Atle Gulla (Jul. 2001).*

(Continued)

*Primary Examiner* — Kannan Shanmugasundaram
(74) *Attorney, Agent, or Firm* — Staas & Halsey LLP

(57) ABSTRACT

A computer-readable recording medium stores a program causing a computer to execute an information generating process that includes tabulating an appearance frequency for each designated word in an object file group in which character strings are described; identifying for each designated word and based on the appearance frequency tabulated for the designated word, a rank in descending order up to a target appearance rate for the designated words; detecting in an object file selected from the object file group, specific designated words among the identified ranks; and generating for each of the detected specific designated words, index information that indicates the presence/absence of the specific designated word in each object file among the object file group.

6 Claims, 34 Drawing Sheets

(56) References Cited

FOREIGN PATENT DOCUMENTS

| | | |
|---|---|---|
| JP | 3-174652 | 7/1991 |
| JP | 5-135102 | 6/1993 |
| JP | 5-174064 | 7/1993 |
| JP | 8-314966 | 11/1996 |
| JP | 10-149367 | 6/1998 |
| JP | 2001-337969 | 12/2001 |
| JP | 2003-281159 | 10/2003 |
| JP | 2004-178614 | 6/2004 |
| WO | WO 02/054289 A1 | 7/2002 |
| WO | WO 2008/047432 A1 | 4/2008 |

OTHER PUBLICATIONS

"A Very Fast Substring Search Algorithm" Daniel M. Sunday (Aug. 1991).*
JIS X 0208 Wikipedia.org (as indexed Jun. 28, 2009).*
Japanese Office Action dated Sep. 30, 2014 in corresponding Japanese Patent Application No. 2012-517077.
Chinese Office Action issued Dec. 22, 2014 in corresponding Chinese Patent Application No. 201080067094.4.
Japanese Office Action mailed Apr. 8, 2014 in corresponding Japanese Application No. 2012-517077.
Japanese Office Action mailed Aug. 27, 2013 in corresponding Japanese Application No. 2012-517077.
International Search Report of Corresponding PCT Application PCT/JP2010/059150 mailed Jun. 22, 2010.
Japanese Office Action dated Dec. 8, 2015 in related Japanese Patent Application No. 2015-000576 (3 pages) (1 page English Translation).
Japanese Office Action dated Aug. 2, 2016 in related Japanese Patent Application No. 2015-000576 (3 pages) (3 pages English Translation).
Extended European Search Report dated Sep. 22, 2016 in related European Patent Application No. 10852178.2 (6 pages).

* cited by examiner

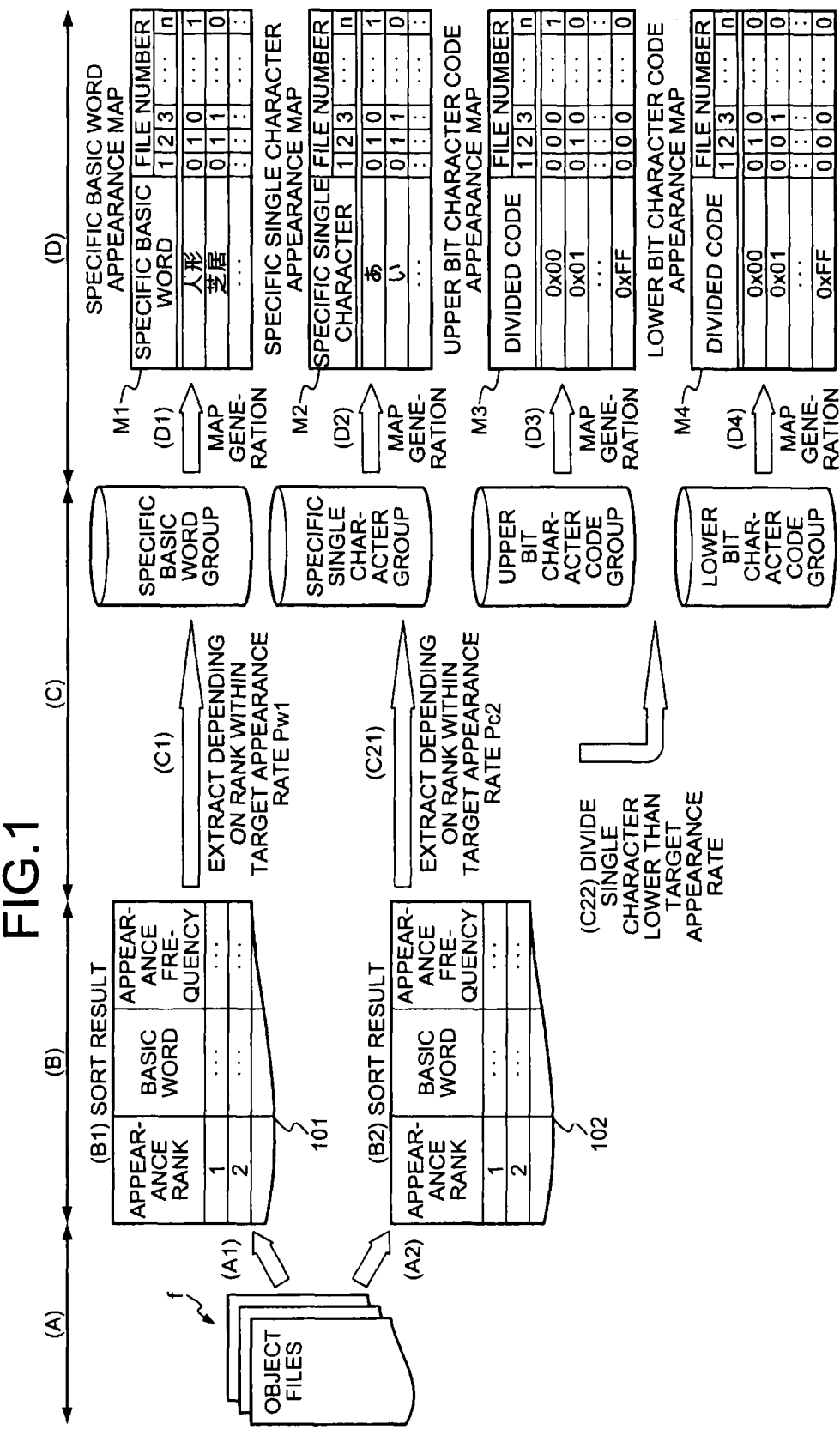

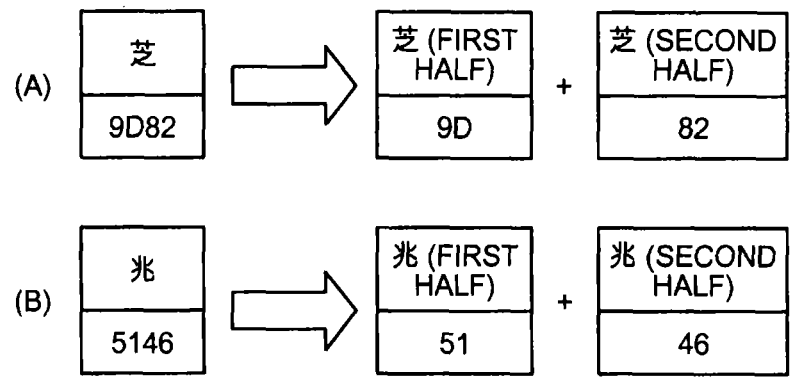
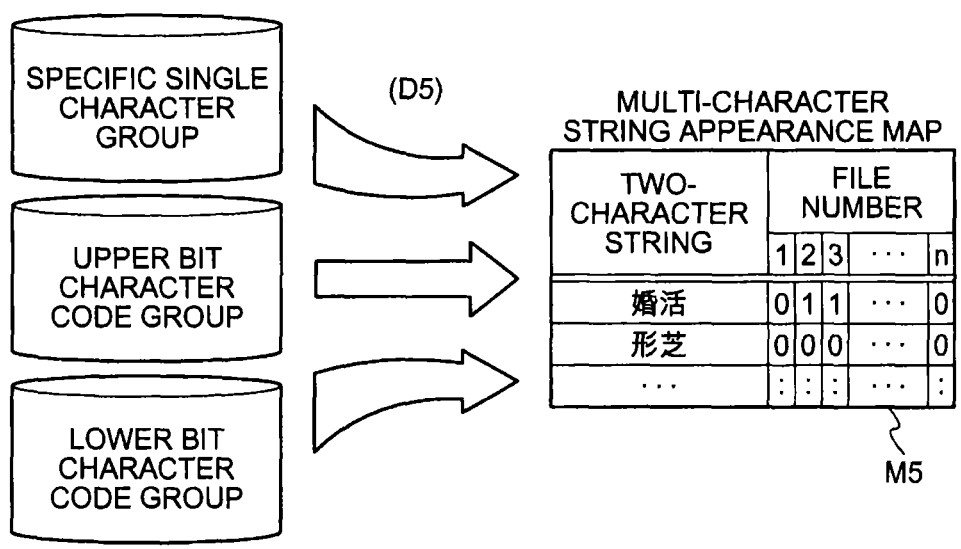

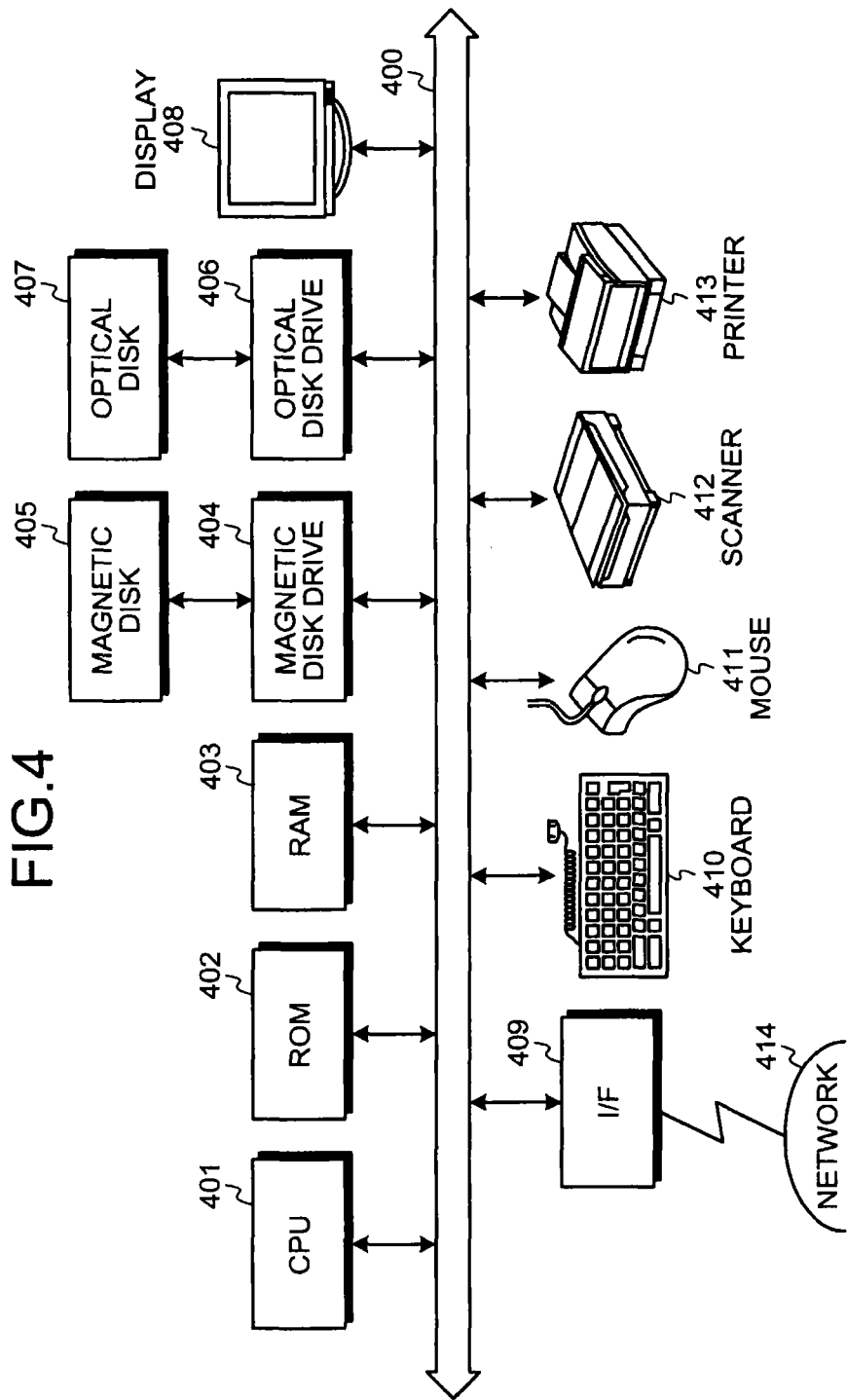

FIG.6

|  | SPECIFIC SINGLE CHARACTER | | 2MULTI-CHARACTER STRING APPEARANCE MAP | | SPECIFIC BASIC WORD APPEARANCE MAP | |
|---|---|---|---|---|---|---|
| (A) 私の結婚活動の記録 ↑ | SPECIFIC SINGLE CHARACTER | FILE NUMBER 123 ··· i | | | | |
| | 私 | 100 ··· 1 | | | | |
| (B) 私の結婚活動の記録 ↑ | SPECIFIC SINGLE CHARACTER | FILE NUMBER 123 ··· i | TWO-CHARACTER STRING | FILE NUMBER 123 ··· i | | |
| | の | 111 ··· 1 | 私の | 011 ··· 1 | | |
| (C) 私の結婚活動の記録 ↑ | SPECIFIC SINGLE CHARACTER | FILE NUMBER 123 ··· i | TWO-CHARACTER STRING | FILE NUMBER 123 ··· i | SPECIFIC BASIC WORD | FILE NUMBER 123 ··· i |
| | 結 | 001 ··· 1 | の結 | 000 ··· 1 | 結婚 | 001 ··· 1 |
| (D) 私の結婚活動の記録 ↑ | SPECIFIC SINGLE CHARACTER | FILE NUMBER 123 ··· i | TWO-CHARACTER STRING | FILE NUMBER 123 ··· i | | |
| | 婚 | 001 ··· 1 | 結婚 | 001 ··· 1 | | |
| (E) 私の結婚活動の記録 ↑ | SPECIFIC SINGLE CHARACTER | FILE NUMBER 123 ··· i | TWO-CHARACTER STRING | FILE NUMBER 123 ··· i | SPECIFIC BASIC WORD | FILE NUMBER 123 ··· i |
| | 活 | 101 ··· 1 | 婚活 | 000 ··· 1 | 活動 | 101 ··· 1 |
| (F) 私の結婚活動の記録 ↑ | SPECIFIC SINGLE CHARACTER | FILE NUMBER 123 ··· i | TWO-CHARACTER STRING | FILE NUMBER 123 ··· i | | |
| | 動 | 101 ··· 1 | 活動 | 101 ··· 1 | | |
| (G) 私の結婚活動の記録 ↑ | SPECIFIC SINGLE CHARACTER | FILE NUMBER 123 ··· i | TWO-CHARACTER STRING | FILE NUMBER 123 ··· i | | |
| | の | 111 ··· 1 | 動の | 000 ··· 1 | | |
| (H) 私の結婚活動の記録 ↑ | SPECIFIC SINGLE CHARACTER | FILE NUMBER 123 ··· i | TWO-CHARACTER STRING | FILE NUMBER 123 ··· i | SPECIFIC BASIC WORD | FILE NUMBER 123 ··· i |
| | 記 | 111 ··· 1 | の記 | 000 ··· 1 | 記録 | 110 ··· 1 |
| (I) 私の結婚活動の記録 ↑ | SPECIFIC SINGLE CHARACTER | FILE NUMBER 123 ··· i | TWO-CHARACTER STRING | FILE NUMBER 123 ··· i | | |
| | 録 | 000 ··· 1 | 記録 | 000 ··· 1 | | |

FIG.7

| | SPECIFIC SINGLE CHARACTER APPEARANCE MAP DIVIDED CHARACTER CODE APPEARANCE MAP | | 2MULTI-CHARACTER STRING APPEARANCE MAP | |
|---|---|---|---|---|
| (A) 竜馬は脱藩した ↑ | SPECIFIC SINGLE CHARACTER | FILE NUMBER 123 ··· i | | |
| | 竜 | 000 ··· 1 | | |
| (B) 竜馬は脱藩した ↑ | SPECIFIC SINGLE CHARACTER | FILE NUMBER 123 ··· i | TWO-CHARACTER STRING | FILE NUMBER 123 ··· i |
| | 馬 | 001 ··· 1 | 竜馬 | 000 ··· 1 |
| (C) 竜馬は脱藩した ↑ | SPECIFIC SINGLE CHARACTER | FILE NUMBER 123 ··· i | TWO-CHARACTER STRING | FILE NUMBER 123 ··· i |
| | は | 111 ··· 1 | 馬は | 000 ··· 1 |
| (D) 竜馬は脱藩した ⌒ 0x81 0x31 ↑ | UPPER BIT CHARACTER CODE | FILE NUMBER 123 ··· i | TWO-CHARACTER STRING | FILE NUMBER 123 ··· i |
| | 0x81 | 100 ··· 1 | は 0x81 | 100 ··· 1 |
| (E) 竜馬は脱藩した ⌒ 0x81 0x31 ↑ | LOWER BIT CHARACTER CODE | FILE NUMBER 123 ··· i | TWO-CHARACTER STRING | FILE NUMBER 123 ··· i |
| | 0x31 | 011 ··· 1 | 0x81 0x31 | 010 ··· 1 |
| (F) 竜馬は脱藩した ⌒ 0xE9 0x85 ↑ | UPPER BIT CHARACTER CODE | FILE NUMBER 123 ··· i | TWO-CHARACTER STRING | FILE NUMBER 123 ··· i |
| | 0xE9 | 011 ··· 1 | 0x31 0xE9 | 000 ··· 1 |
| (G) 竜馬は脱藩した ⌒ 0xE9 0x85 ↑ | LOWER BIT CHARACTER CODE | FILE NUMBER 123 ··· i | TWO-CHARACTER STRING | FILE NUMBER 123 ··· i |
| | 0x85 | 100 ··· 1 | 0xE9 0x85 | 000 ··· 1 |
| (H) 竜馬は脱藩した ↑ | SPECIFIC SINGLE CHARACTER | FILE NUMBER 123 ··· i | TWO-CHARACTER STRING | FILE NUMBER 123 ··· i |
| | し | 111 ··· 1 | 0x85 し | 000 ··· 1 |
| (I) 竜馬は脱藩した ↑ | SPECIFIC SINGLE CHARACTER | FILE NUMBER 123 ··· i | TWO-CHARACTER STRING | FILE NUMBER 123 ··· i |
| | た | 111 ··· 1 | した | 111 ··· 1 |

FIG.8A

| | SPECIFIC SINGLE CHARACTER | | 2MULTI-CHARACTER STRING APPEARANCE MAP | | SPECIFIC BASIC WORD APPEARANCE MAP | |
|---|---|---|---|---|---|---|
| (A)<br>that□is□a□pen<br>↑ | SPECIFIC SINGLE CHAR-ACTER | FILE NUMBER | | | SPECIFIC BASIC WORD | FILE NUMBER |
| | | 123 ··· i | | | | 123 ··· i |
| | t | 111 ··· 1 | | | that | 011 ··· 1 |
| (B)<br>that□is□a□pen<br>↑ | SPECIFIC SINGLE CHAR-ACTER | FILE NUMBER | TWO-CHAR-ACTER STRING | FILE NUMBER | | |
| | | 123 ··· i | | 123 ··· i | | |
| | h | 111 ··· 1 | th | 011 ··· 1 | | |
| (C)<br>that□is□a□pen<br>↑ | SPECIFIC SINGLE CHAR-ACTER | FILE NUMBER | TWO-CHAR-ACTER STRING | FILE NUMBER | | |
| | | 123 ··· i | | 123 ··· i | | |
| | a | 111 ··· 1 | ha | 000 ··· 1 | | |
| (D)<br>that□is□a□pen<br>↑ | SPECIFIC SINGLE CHAR-ACTER | FILE NUMBER | TWO-CHAR-ACTER STRING | FILE NUMBER | | |
| | | 123 ··· i | | 123 ··· i | | |
| | t | 111 ··· 1 | at | 111 ··· 1 | | |
| (E)<br>that□is□a□pen<br>↑ | SPECIFIC SINGLE CHAR-ACTER | FILE NUMBER | TWO-CHAR-ACTER STRING | FILE NUMBER | | |
| | | 123 ··· i | | 123 ··· i | | |
| | □ | 111 ··· 1 | t□ | 111 ··· 1 | | |
| (F)<br>that□is□a□pen<br>↑ | SPECIFIC SINGLE CHAR-ACTER | FILE NUMBER | TWO-CHAR-ACTER STRING | FILE NUMBER | SPECIFIC BASIC WORD | FILE NUMBER |
| | | 123 ··· i | | 123 ··· i | | 123 ··· i |
| | i | 111 ··· 1 | □i | 000 ··· 1 | is | 011 ··· 1 |

FIG.8B

| | SPECIFIC SINGLE CHARACTER | | 2MULTI-CHARACTER STRING APPEARANCE MAP | | SPECIFIC BASIC WORD APPEARANCE MAP | |
|---|---|---|---|---|---|---|
| (G) that□is□a□pen ↑ | SPECIFIC SINGLE CHARACTER | FILE NUMBER 123 ··· i | TWO-CHARACTER STRING | FILE NUMBER 123 ··· i | | |
| | s | 111 ··· 1 | is | 111 ··· 1 | | |
| (H) that□is□a□pen ↑ | SPECIFIC SINGLE CHARACTER | FILE NUMBER 123 ··· i | TWO-CHARACTER STRING | FILE NUMBER 123 ··· i | | |
| | □ | 111 ··· 1 | s□ | 110 ··· 1 | | |
| (I) that□is□a□pen ↑ | SPECIFIC SINGLE CHARACTER | FILE NUMBER 123 ··· i | TWO-CHARACTER STRING | FILE NUMBER 123 ··· i | SPECIFIC BASIC WORD | FILE NUMBER 123 ··· i |
| | a | 111 ··· 1 | □a | 111 ··· 1 | a | 111 ··· 1 |
| (J) that□is□a□pen ↑ | SPECIFIC SINGLE CHARACTER | FILE NUMBER 123 ··· i | TWO-CHARACTER STRING | FILE NUMBER 123 ··· i | | |
| | □ | 111 ··· 1 | a□ | 111 ··· 1 | | |
| (K) that□is□a□pen ↑ | SPECIFIC SINGLE CHARACTER | FILE NUMBER 123 ··· i | TWO-CHARACTER STRING | FILE NUMBER 123 ··· i | SPECIFIC BASIC WORD | FILE NUMBER 123 ··· i |
| | p | 111 ··· 1 | □p | 011 ··· 1 | pen | 010 ··· 1 |
| (L) that□is□a□pen ↑ | SPECIFIC SINGLE CHARACTER | FILE NUMBER 123 ··· i | TWO-CHARACTER STRING | FILE NUMBER 123 ··· i | | |
| | e | 111 ··· 1 | pe | 000 ··· 1 | | |
| (M) that□is□a□pen ↑ | SPECIFIC SINGLE CHARACTER | FILE NUMBER 123 ··· i | TWO-CHARACTER STRING | FILE NUMBER 123 ··· i | | |
| | n | 111 ··· 1 | en | 101 ··· 1 | | |

FIG.9

| | SPECIFIC SINGLE CHARACTER | | 2MULTI-CHARACTER STRING APPEARANCE MAP | | SPECIFIC BASIC WORD APPEARANCE MAP | |
|---|---|---|---|---|---|---|
| (A) internal ↑ | SPECIFIC SINGLE CHARACTER | FILE NUMBER | | | SPECIFIC BASIC WORD | FILE NUMBER |
| | | 123 ⋯ i | | | | 123 ⋯ i |
| | i | 111 ⋯ 1 | | | inter | 100 ⋯ 1 |
| (B) internal ↑ | SPECIFIC SINGLE CHARACTER | FILE NUMBER | TWO-CHARACTER STRING | FILE NUMBER | | |
| | | 123 ⋯ i | | 123 ⋯ i | | |
| | n | 111 ⋯ 1 | in | 011 ⋯ 1 | | |
| (C) internal ↑ | SPECIFIC SINGLE CHARACTER | FILE NUMBER | TWO-CHARACTER STRING | FILE NUMBER | | |
| | | 123 ⋯ i | | 123 ⋯ i | | |
| | t | 111 ⋯ 1 | nt | 000 ⋯ 1 | | |
| (D) internal ↑ | SPECIFIC SINGLE CHARACTER | FILE NUMBER | TWO-CHARACTER STRING | FILE NUMBER | | |
| | | 123 ⋯ i | | 123 ⋯ i | | |
| | e | 111 ⋯ 1 | te | 111 ⋯ 1 | | |
| (E) internal ↑ | SPECIFIC SINGLE CHARACTER | FILE NUMBER | TWO-CHARACTER STRING | FILE NUMBER | | |
| | | 123 ⋯ i | | 123 ⋯ i | | |
| | r | 111 ⋯ 1 | er | 100 ⋯ 1 | | |
| (F) internal ↑ | SPECIFIC SINGLE CHARACTER | FILE NUMBER | TWO-CHARACTER STRING | FILE NUMBER | | |
| | | 123 ⋯ i | | 123 ⋯ i | | |
| | n | 111 ⋯ 1 | rn | 111 ⋯ 1 | | |
| (G) internal ↑ | SPECIFIC SINGLE CHARACTER | FILE NUMBER | TWO-CHARACTER STRING | FILE NUMBER | | |
| | | 123 ⋯ i | | 123 ⋯ i | | |
| | a | 111 ⋯ 1 | na | 110 ⋯ 1 | | |
| (H) internal ↑ | SPECIFIC SINGLE CHARACTER | FILE NUMBER | TWO-CHARACTER STRING | FILE NUMBER | | |
| | | 123 ⋯ i | | 123 ⋯ i | | |
| | l | 111 ⋯ 1 | al | 011 ⋯ 1 | | |

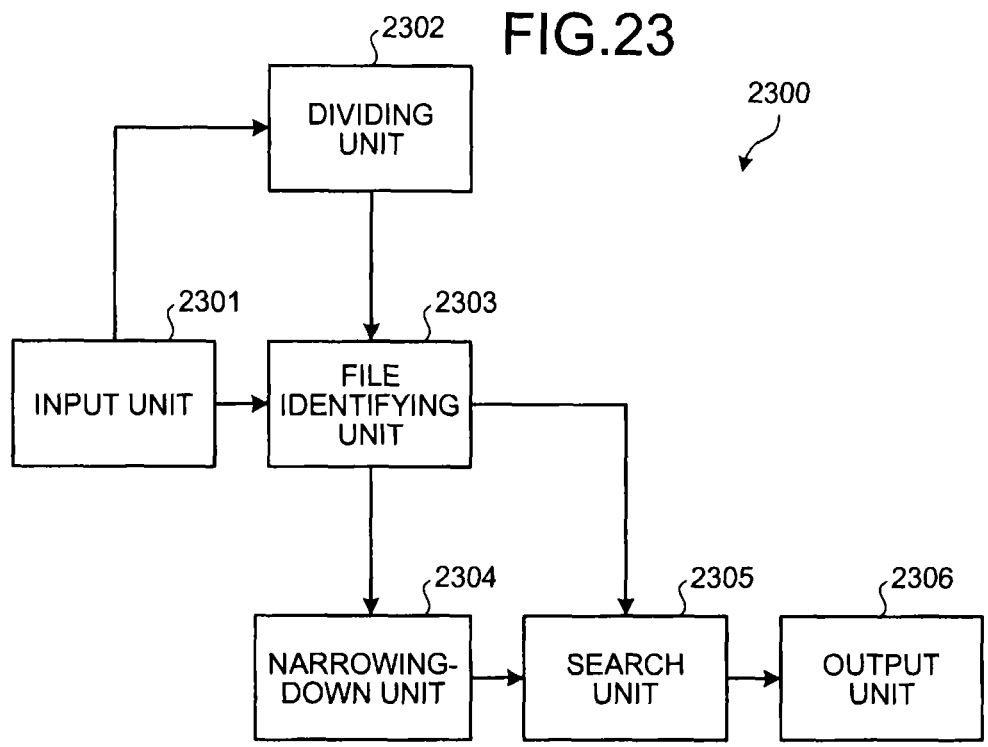

FIG.25

SEARCH CHARACTER STRING: "婚活" (NOT BASIC WORD)

| SPECIFIC SINGLE CHARACTER | FILE NUMBER | | | |
|---|---|---|---|---|
| | 1 | 2 | 3 | ... n |
| 婚 | 0 | 0 | 1 | ... 1 |

| SPECIFIC SINGLE CHARACTER | FILE NUMBER | | | |
|---|---|---|---|---|
| | 1 | 2 | 3 | ... n |
| 活 | 1 | 0 | 1 | ... 1 |

| TWO-CHARACTER STRING | FILE NUMBER | | | |
|---|---|---|---|---|
| | 1 | 2 | 3 | ... n |
| 婚活 | 0 | 0 | 0 | ... 1 |

| AND RESULT | 0 | 0 | 0 | ... 1 |

FILE Fn INCLUDES "婚活"

FIG.26

SEARCH CHARACTER STRING: "脱藩"

| UPPER BIT CHARACTER CODE | FILE NUMBER | | |
|---|---|---|---|
| | 1 2 3 | ⋯ | n |
| 0x81 | 1 0 0 | ⋯ | 1 |

| LOWER BIT CHARACTER CODE | FILE NUMBER | | |
|---|---|---|---|
| | 1 2 3 | ⋯ | n |
| 0x31 | 0 1 1 | ⋯ | 1 |

| UPPER BIT CHARACTER CODE | FILE NUMBER | | |
|---|---|---|---|
| | 1 2 3 | ⋯ | n |
| 0xE9 | 0 1 1 | ⋯ | 1 |

| LOWER BIT CHARACTER CODE | FILE NUMBER | | |
|---|---|---|---|
| | 1 2 3 | ⋯ | n |
| 0x85 | 1 0 0 | ⋯ | 1 |

| TWO-CHARACTER STRING | FILE NUMBER | | |
|---|---|---|---|
| | 1 2 3 | ⋯ | n |
| 0x81 0x31 | 0 1 0 | ⋯ | 1 |

| TWO-CHARACTER STRING | FILE NUMBER | | |
|---|---|---|---|
| | 1 2 3 | ⋯ | n |
| 0x31 0xE9 | 0 0 0 | ⋯ | 1 |

| TWO-CHARACTER STRING | FILE NUMBER | | |
|---|---|---|---|
| | 1 2 3 | ⋯ | n |
| 0xE9 0x85 | 0 0 0 | ⋯ | 1 |

| AND RESULT | 0 0 0 | ⋯ | 1 |
|---|---|---|---|

↑
FILE Fn IS
LIKELY TO
INCLUDE
"脱藩"

FIG.27

SEARCH CHARACTER STRING: "離脱"

| SPECIFIC SINGLE CHARACTER | FILE NUMBER | | | | |
|---|---|---|---|---|---|
| | 1 | 2 | 3 | ... | n |
| 離 | 0 | 0 | 0 | ... | 1 |

| UPPER BIT CHARACTER CODE | FILE NUMBER | | | | |
|---|---|---|---|---|---|
| | 1 | 2 | 3 | ... | n |
| 0x81 | 1 | 0 | 0 | ... | 1 |

| LOWER BIT CHARACTER CODE | FILE NUMBER | | | | |
|---|---|---|---|---|---|
| | 1 | 2 | 3 | ... | n |
| 0x31 | 0 | 1 | 1 | ... | 1 |

| TWO-CHARACTER STRING | FILE NUMBER | | | | |
|---|---|---|---|---|---|
| | 1 | 2 | 3 | ... | n |
| 離 0x81 | 0 | 0 | 0 | ... | 1 |

| TWO-CHARACTER STRING | FILE NUMBER | | | | |
|---|---|---|---|---|---|
| | 1 | 2 | 3 | ... | n |
| 0x81 0x31 | 0 | 1 | 0 | ... | 1 |

| AND RESULT | 0 | 0 | 0 | ... | 1 |
|---|---|---|---|---|---|

FILE Fn IS LIKELY TO INCLUDE "離脱"

FIG.28

SEARCH CHARACTER STRING: "脱出"

| UPPER BIT CHARACTER CODE | FILE NUMBER | | | | |
|---|---|---|---|---|---|
| | 1 | 2 | 3 | ··· | n |
| 0x81 | 1 | 0 | 0 | ··· | 1 |

| LOWER BIT CHARACTER CODE | FILE NUMBER | | | | |
|---|---|---|---|---|---|
| | 1 | 2 | 3 | ··· | n |
| 0x31 | 0 | 1 | 1 | ··· | 1 |

| SPECIFIC SINGLE CHARACTER | FILE NUMBER | | | | |
|---|---|---|---|---|---|
| | 1 | 2 | 3 | ··· | n |
| 0x31 | 1 | 1 | 1 | ··· | 1 |

| TWO-CHARACTER STRING | FILE NUMBER | | | | |
|---|---|---|---|---|---|
| | 1 | 2 | 3 | ··· | n |
| 0x81 0x31 | 0 | 1 | 0 | ··· | 1 |

| TWO-CHARACTER STRING | FILE NUMBER | | | | |
|---|---|---|---|---|---|
| | 1 | 2 | 3 | ··· | n |
| 0x31 出 | 0 | 0 | 0 | ··· | 1 |

| AND RESULT | 0 | 0 | 0 | ··· | 1 |
|---|---|---|---|---|---|

FILE Fn IS LIKELY TO INCLUDE "脱出"

FIG.29

SEARCH CHARACTER STRING: "is" "a" (BOTH BASIC WORDS)
SEARCH CONDITION: AND

| SPECIFIC BASIC WORD | FILE NUMBER | | |
|---|---|---|---|
| | 1 2 3 | ... | n |
| is | 0 1 1 | ... | 1 |
| a | 1 0 1 | ... | 1 |

| AND RESULT | 0 0 1 | ... | 1 |
|---|---|---|---|

FILES F3 AND Fn INCLUDE
CHARACTER STRING HAVING
BASIC WORDS "is" AND "a"

FIG.30

SEARCH CHARACTER STRING: "tern"

| TWO-CHARACTER STRING | FILE NUMBER | | |
|---|---|---|---|
| | 1 2 3 | ... | n |
| te | 0 0 0 | | 1 |
| er | 0 0 0 | | 1 |
| rn | 0 0 0 | | 1 |

FILE NUMBER n
HAS CHARACTER
STRING "tern"

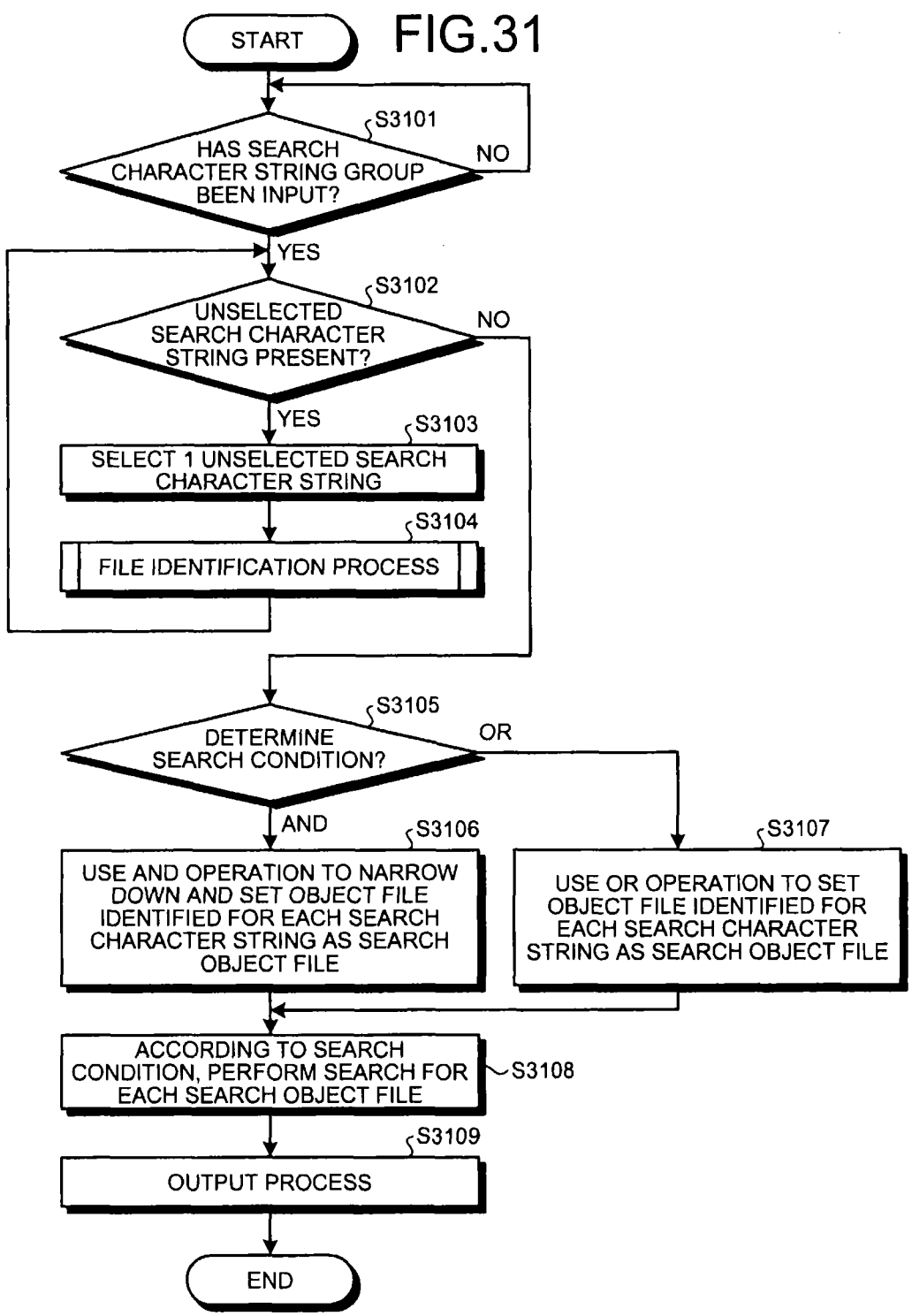

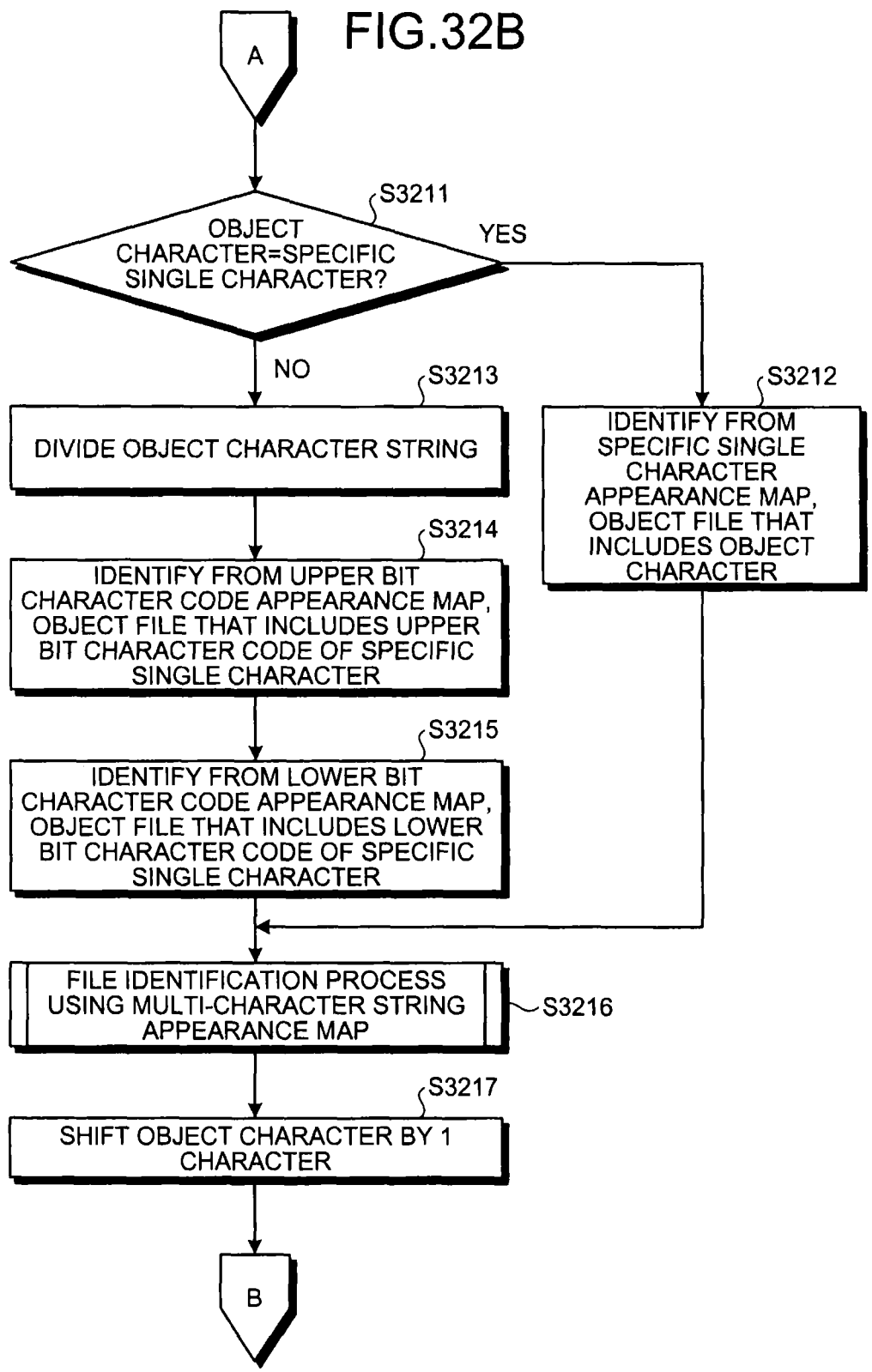

| SPECIFIC BASIC WORD GROUP | SEGMENT S1 | | | | |
|---|---|---|---|---|---|
| SPECIFIC BASIC WORD | FILE NUMBER | | | | |
| | 1 | 2 | 3 | ... | n | n+1 |
| 結婚 | 0 | 0 | 1 | ... | 1 | 0 |
| 活動 | 1 | 0 | 1 | ... | 0 | 0 |
| : | : | : | : | : | : | : |

(B)

| SPECIFIC BASIC WORD GROUP | SEGMENT S1 | | | | SEGMENT S2 | | |
|---|---|---|---|---|---|---|---|
| SPECIFIC BASIC WORD | FILE NUMBER | | | | FILE NUMBER | | |
| | 1 | 2 | 3 | ... | n | n+1 | ... | 2n |
| 結婚 | 0 | 0 | 1 | ... | 1 | 0 | ... | 0 |
| 活動 | 1 | 0 | 1 | ... | 0 | 0 | ... | 0 |
| : | : | : | : | : | : | : | : | : |

(C)

| SPECIFIC BASIC WORD GROUP | SEGMENT S1 | | | | SEGMENT S2 | | | |
|---|---|---|---|---|---|---|---|---|
| SPECIFIC BASIC WORD | FILE NUMBER | | | | FILE NUMBER | | | |
| | 1 | 2 | 3 | ... | n | n+1 | ... | 2n | n+1 |
| 結婚 | 0 | 0 | 1 | ... | 1 | 0 | ... | 0 | 0 |
| 活動 | 1 | 0 | 1 | ... | 0 | 0 | ... | 0 | 1 |
| : | : | : | : | : | : | : | : | : | : |

(D)

| SPECIFIC BASIC WORD GROUP | SEGMENT S1 | SEGMENT S2 | ... | SEGMENT SN |
|---|---|---|---|---|

INFORMATION GENERATING COMPUTER PRODUCT, APPARATUS, AND METHOD; AND INFORMATION SEARCH COMPUTER PRODUCT, APPARATUS, AND METHOD

CROSS REFERENCE TO RELATED APPLICATIONS

This application is a continuation application of International Application PCT/JP2010/059150, filed on May 28, 2010 and designating the U.S., the entire contents of which are incorporated herein by reference.

FIELD

The embodiments discussed herein are related to a computer product, an information generating apparatus, an information search apparatus, an information generating method, and an information search method for generating index information indicating the presence/absence of characters and basic words to perform a search by using the index information.

BACKGROUND

A bitmap type full-text search technique is conventionally known that rapidly generates a full-text search index such as a character component table (see, for example, Japanese Laid-Open Patent Publication Nos. H1-181329, H3-174652, and H5-174064). Since morphological analysis is not performed in the conventional bitmap type full-text search techniques, the index can be rapidly generated and bitmaps can be compressed. A typical Japanese-language dictionary includes about 240,000 entries and is described with about 6000 to 8000 characters and therefore, has about 6000 to 8000 bitmaps for single characters.

However, the conventional techniques described above have a problem in that bitmaps of single characters lead to lower efficiency in the narrowing down of object items because hiragana, katakana, and alphabetic characters included in items (records) appear at higher frequencies.

If bitmaps of two-character strings are added, the volume of data increases and considerable memory is consumed. Volume reduction by hashing generates search noise. Therefore, the efficiency of narrowing down bitmaps drops, resulting in slower search speeds.

On the other hand, character strings forming words in alphabetic, hiragana, and katakana characters etc., generate search noise due to connection of characters. For example, the sentence "that is a pen", which includes the English substantive verb "is" and indefinite article "a", cannot be searched. Particularly, since the alphabetic character "a" appears at a very high frequency, if a search is performed for the indefinite article "a", almost all the example sentences and words are searched as candidates.

In this regard, it is conceivable that a bitmap is generated for each basic word used as an entry word of a dictionary such as "結婚" and "活動". However, this causes a problem in that no hit is retrieved by searching for character strings other than basic words. For example, when a search is performed for a character string "婚活" even if files including character strings "活動", "活動", and "結婚活動" are present, the corresponding files cannot be identified since the search is not performed for "結婚" or "活動". As described above, so-called parting occurs between the end character "婚" of the basic word "結婚" and the starting character "活" of the basic character "活動".

Although candidate files can be identified by searching for basic words ending with "婚" and basic words starting with "活" to cover all the mutual combinations of bitmaps, and the bitmaps can be read to perform an AND operation, not much can be expected in terms of the narrowing down of candidate files because of search noise generated by the hashing of the bitmaps and the time required for a series of processes such as searching among keywords.

SUMMARY

According to an aspect of an embodiment, a computer-readable recording medium stores a program causing a computer to execute an information generating process that includes tabulating an appearance frequency for each designated word in an object file group in which character strings are described; identifying for each designated word and based on the appearance frequency tabulated for the designated word, a rank in descending order up to a target appearance rate for the designated words; detecting in an object file selected from the object file group, specific designated words among the identified ranks; and generating for each of the detected specific designated words, index information that indicates the presence/absence of the specific designated word in each object file among the object file group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of an example of information generation in an information generating apparatus (part 1);

FIG. 2 is an explanatory diagram of an example of division of a non-specific character;

FIG. 3 is an explanatory diagram of an example of information generation in the information generating apparatus (part 2);

FIG. 4 is a block diagram of a hardware configuration of the information generating apparatus according to the embodiments;

FIG. 6 is an explanatory diagram of a map generation example (part 1);

FIG. 7 is an explanatory diagram of a map generation example (part 2);

FIG. 8A is an explanatory diagram of a map generation example (part 3, first half);

FIG. 8B is an explanatory diagram of a map generation example (part 3, second half);

FIG. 9 is explanatory diagram of a map generation example (part 4);

FIG. 23 is a block diagram of an example of a functional configuration of the information search apparatus;

FIG. 24 is an explanatory diagram of an example (part 1) of an information search process;

FIG. 25 is an explanatory diagram of an example (part 2) of the information search process;

FIG. 26 is an explanatory diagram of an example (part 3) of the information search process;

FIG. 27 is an explanatory diagram of an example (part 4) of the information search process;

FIG. 28 is an explanatory diagram of an example (part 5) of the information search process;

FIG. 29 is an explanatory diagram of an example (part 6) of the information search process;

FIG. 30 is an explanatory diagram of an example (part 7) of the information search process;

FIG. 31 is a flowchart of an information search process procedure of an information search apparatus 2300;

FIG. 32B is a flowchart (part 2) of a detailed process procedure of the file identification process (step S3104) depicted in FIG. 31;

FIG. 35 is an explanatory diagram of map projection;

DESCRIPTION OF EMBODIMENTS

Figure 5:
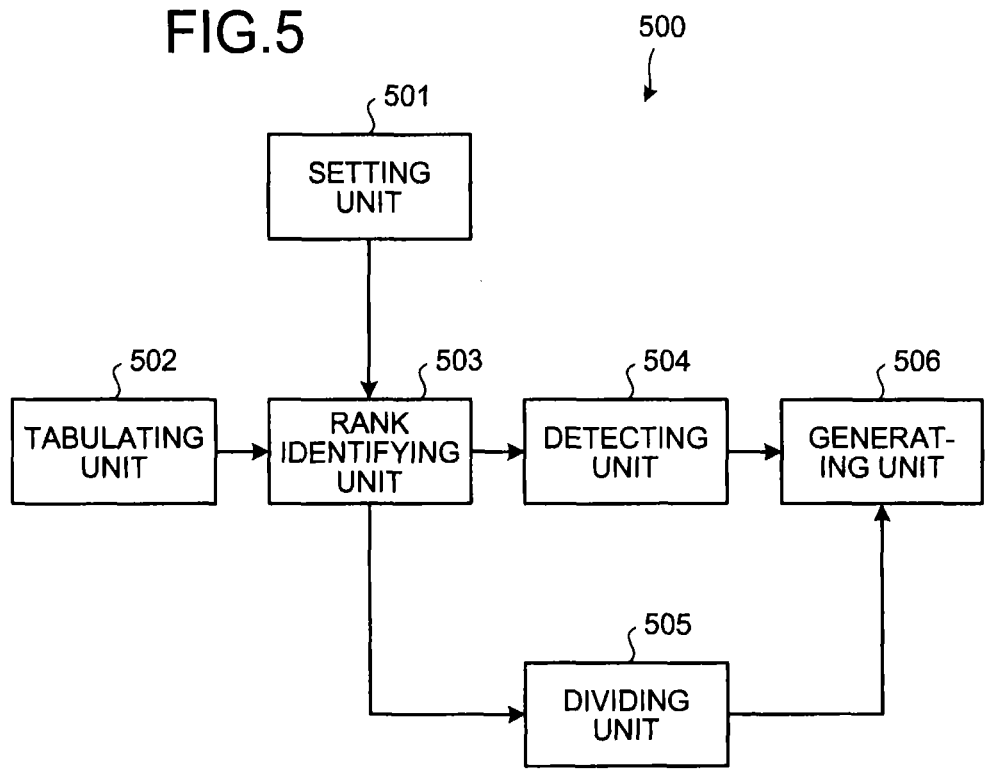
FIG. 5 is a block diagram of an example of a functional configuration of the information generating apparatus.

An information generating program, an information search program, an information generating apparatus, an information search apparatus, an information generating method, and an information search method according to the present invention will be described in detail with reference to the accompanying diagrams.

The information generating program, the information generating apparatus, and the information generating method will be described.

FIG. 1 is an explanatory diagram of an example of information generation in the information generating apparatus (part 1). In FIG. 1, an object file group F is a collection of object files. The object files are electronic data in which character strings are described. The object files are electronic data such as dictionaries, electronic books, and web pages, for example, and are described in text, HyperText Markup Language (HTML), and Extensible Markup Language (XML) formats.

The information generating apparatus executes four phases including (A) tabulation from the object file group F, (B) sorting in descending order of appearance frequency, (C) extraction until the rank of a target appearance rate, and (D) map generation. Basic words and single characters will be described separately hereinafter.

(A1) First, the information generating apparatus reads the object file group F and counts the appearance frequencies of basic words. A basic word means a preliminarily designated word in a word group. For example, in the case of a dictionary, entry words correspond to the basic words. The information generating apparatus refers to a basic word structure formed by collecting basic words and, if an object file includes a character string matching a basic word in the basic word structure, the information generating apparatus adds one to the appearance frequency of the basic word (default value is zero). The basic word structure is a data structure in which basic words are described.

(B1) Once the tabulation of basic words is completed for the object file group F, the information generating apparatus sorts a basic word appearance frequency table 101 in descending order of the appearance frequency and ranks the basic words in descending order from the highest appearance frequency.

(C1) The information generating apparatus refers to the basic word appearance frequency table 101 after the sorting at (B1) and extracts the basic words ranked up to a target appearance rate Pw. For example, the information generating apparatus calculates the appearance rate for each rank by using the sum of appearance frequencies (the total appearance frequency) of all the basic words as the denominator and takes the running total of the appearance frequencies in descending order from the basic word ranked in the first place as the numerator.

For example, assuming that the total appearance frequency is 50000 and that the cumulative appearance frequency of basic words from the first place to the x-th place is 45000, the appearance frequency until the x-th place is $(45000/50000) \times 100 = 90$ [%]. If the target appearance rate Pw is 90 [%], the basic words ranked in the top x are extracted. The basic words extracted at (C1) are referred to as "specific basic words (group)" so as to distinguish the words from original basic words.

(D1) Lastly, the information generating apparatus generates a specific basic word appearance map M1 for the specific basic word group. The specific basic word appearance map M1 is index information in bitmap format indicating the presence/absence of the specific basic words in each object file for each specific basic word. If a specific basic word appears at least once in each object file, the corresponding bit of the object file is turned on and if a specific basic word never appears, the corresponding bit of the object file is kept off.

In this description, if a "bit is turned on", a value of the bit turns to "1" and if a "bit is turned off", a value of the bit turns to "0". If a "bit is turned on", a value of the bit may turn to "0" and if a "bit is turned off", a value of the bit may turn to "1". Single characters will be described.

(A2) The information generating apparatus reads the object file group F and counts the appearance frequencies of single characters. A single character is a character represented by a character code of a predetermined bit length. For example, the single characters are characters of UCS/Unicode Transformation Format (UTF) 16-bit character codes. The information generating apparatus refers to a single character structure formed by collecting single characters and if an object file includes a single character matching a single character in the single character structure, the information generating apparatus adds one to the appearance frequency of the single character (default value is zero). The single character structure is a data structure in which single characters are described.

(B2) Once the tabulation of single characters is completed for the object file group F, the information generating apparatus sorts a single character appearance frequency table 102 in descending order of the appearance frequency. Therefore, the table is sorted in order from the highest appearance frequency and single characters are ranked in order from the highest appearance frequency.

(C21) The information generating apparatus refers to the single character appearance frequency table 102 after the sorting at (B2) to extract the single characters ranked up to a target appearance rate Pc. For example, the information generating apparatus calculates an appearance rate to each rank by using the sum of appearance frequencies (the total appearance frequency) of all the single characters as the denominator and a running total of the appearance frequencies in descending order from the single character ranked in the first place as the numerator.

For example, assuming that the total appearance frequency is 50000 and that the cumulative appearance frequency of single characters from the first place to the y-th place is 40000, the appearance frequency until the y-th place is (50000/40000)×100=80 [%]. If the target appearance rate Pc is 80 [%], the single characters ranked in the top y are extracted. The single characters extracted at (C21) are referred to as "specific single characters (group)" so as to distinguish the characters from original single characters.

(C22) Among single characters, single characters excluded from the specific single character group (hereinafter, "nonspecific single character (group)") have an appearance frequency lower than the specific single characters and therefore, the character code thereof is divided. For example, a character code of a nonspecific single character is divided into upper bits and lower bits.

For example, if the single character is represented by a UTF 16-bit character code, the character code is divided into an upper 8 bits and a lower 8 bits. In this case, the upper 8 bits and the lower 8 bits are each represented by a code from 0x00 to 0xFF. The upper bits of the character code are referred to as an "upper bit character code (group)" and the lower bits of character code are referred to as a "lower bit character code (group)".

(D2) The information generating apparatus generates a specific single character appearance map M2 for the specific single character group extracted at (C21). The specific single character appearance map M2 is index information that is in bitmap format and for each specific single character, indicates the presence/absence of the specific single characters in each object file. If a specific single character appears at least once in an object file, the corresponding bit of the object file is turned on and if the specific single character does not appear in the object file, the corresponding bit of the object file is kept off.

(D3) The information generating apparatus generates an upper bit character code appearance map M3 for the upper bit character code group resulting at (C22). The upper bit character code appearance map M3 is index information that is in bitmap format and for each upper bit character code, indicates the presence/absence of the upper bit character codes in each object file. Although both the upper bit character codes and the lower bit character codes are represented in a range from 0x00 to 0xFF, the corresponding bit of the object file is turned on in the upper bit character code appearance map M3 when a code appears as an upper bit character code and not as a lower bit character code.

(D4) The information generating apparatus also generates a lower bit character code appearance map M4 for the lower bit character code group resulting at (C22). The lower bit character code appearance map M4 is index information that is in bitmap format and indicates the presence/absence of the lower bit character codes in each object file for each lower bit character code. Although both the upper bit character codes and the lower bit character codes are represented in a range from 0x00 to 0xFF, the corresponding bit of the object file is turned on in the lower bit character code appearance map M4 when a code appears as a lower bit character code and not as an upper bit character code.

Since the specific basic words and the specific single characters are limited by the target appearance rates Pw and Pc, various appearance map can be generated in the smallest map size necessary by setting the target appearance rates Pw and Pc according to purpose and application. In other words, if a record is assigned to all the basic words and single characters on the maps, a basic word or single character having a lower appearance frequency generates a longer bit string of "0", generating waste in the maps.

Therefore, the map size can be reduced by setting the target appearance rates Pw and Pc according to purpose and application and by registering the specific basic words and the specific single characters corresponding to the target appearance rates Pw and Pc to generate the maps. A basic word excluded from the specific basic words causes no problem because each of single characters making up the basic word is set in the specific single character appearance map M2. A non-specific single character causes no problem because the character is divided and set in the upper bit character code appearance map M3 and the lower bit character code appearance map M4.

The continuity of characters can be set in a multi-character string appearance map M5 described later and therefore causes no problem. As described above, non-specific basic words can be set in the specific single character appearance map M2, the upper bit character code appearance map M3, the lower bit character code appearance map M4, and the multi-character string appearance map M5. Therefore, the presence of non-specific basic words can be determined by the logical AND of these appearance maps.

Although the phases of (A) to (D) may be performed separately for the basic words and the single characters, map generation can be accelerated by simultaneously performing the phases in parallel while shifting characters one-by-one to identify the basic words and the single characters.

FIG. 2 is an explanatory diagram of an example of division of a non-specific character. In FIG. 2, (A) a non-specific single character "芝" and (B) a non-specific single character "焿" are taken as examples for description. The character code of "芝" is "9D82" and is therefore divided into upper bits "0x9D" and lower bits "0x82". Similarly, the character code of "焿" is "5146" and is therefore divided into upper bits "0x51" and lower bits "0x46".

FIG. 3 is an explanatory diagram of an example of information generation in the information generating apparatus (part 2). (D5) As depicted in FIG. 3, the information generating apparatus also generates the multi-character string appearance map M5 at the phase (D) of FIG. 1. A multi-character string is a character string that is a sequence of two or more characters. For example, "結婚" is a two-character string of the specific single character "結" and the specific single character "婚". The single character "芝" is a non-specific single character and is therefore divided into an upper bit character code "0x9D" and a lower bit character code "0x82". Such a sequence of an upper bit character code and a lower bit character code is also a two-character string.

A character string "芝居" is a three-character string of an upper bit character code "0x9D", a lower bit character code "0x82", and a specific single character "居" The character boundary between "芝" and "居" is a two-character string of the lower bit character code "0x82" and the specific single character "居". Similarly, a character string "人工芝" is a four-character string of specific single characters "人" and "工", the upper bit character code "0x9D", and the lower bit character code "0x82". The character boundary between "工" and "芝" is a two-character string of the specific single character "工" and the upper bit character code "0x9D". For simplicity, a two-character string is used in this description.

FIG. 4 is a block diagram of a hardware configuration of the information generating apparatus according to the embodiments. As depicted in FIG. 4, the information generating apparatus includes a central processing unit (CPU) 401, a read-only memory (ROM) 402, a random access memory (RAM) 403, a magnetic disk drive 404, a magnetic disk 405, an optical disk drive 406, an optical disk 407, a display 408, an interface (I/F) 409, a keyboard 410, a mouse 411, a scanner 412, and a printer 413, respectively connected by a bus 400.

The CPU 401 governs overall control of the information generating apparatus. The ROM 402 stores therein programs such as a boot program. The RAM 403 is used as a work area of the CPU 401. The magnetic disk drive 404, under the control of the CPU 401, controls the reading and writing of data with respect to the magnetic disk 405. The magnetic disk 405 stores therein data written under control of the magnetic disk drive 404.

The optical disk drive 406, under the control of the CPU 401, controls the reading and writing of data with respect to the optical disk 407. The optical disk 407 stores therein data written under control of the optical disk drive 406, the data being read by a computer.

The display 408 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 408.

The I/F 409 is connected to a network 414 such as a local area network (LAN), a wide area network (WAN), and the Internet through a communication line and is connected to other apparatuses through the network 414. The I/F 409 administers an internal interface with the network 414 and controls the input and output of data with respect to external apparatuses. For example, a modem or a LAN adaptor may be employed as the I/F 409.

The keyboard 410 includes, for example, keys for inputting letters, numerals, and various instructions and performs the input of data. Alternatively, a touch-panel-type input pad or numeric keypad, etc. may be adopted. The mouse 411 is used to move the cursor, select a region, or move and change the size of windows. A track ball or a joy stick may be adopted provided each respectively has a function similar to a pointing device.

The scanner 412 optically reads an image and takes in the image data into the information generating apparatus. The scanner 412 may have an optical character reader (OCR) function as well. The printer 413 prints image data and text data. The printer 413 may be, for example, a laser printer or an ink jet printer.

FIG. 5 is a block diagram of an example of a functional configuration of the information generating apparatus. An information generating apparatus 500 includes a setting unit 501, a tabulating unit 502, a rank identifying unit 503, a detecting unit 504, a dividing unit 505, and a generating unit 506. For example, functions of the setting unit 501 to the generating unit 506 are implemented by the CPU 401 executing programs stored in a storage device such as the ROM 402, the RAM 403, the magnetic disk 405, and the optical disk 407 depicted in FIG. 4, or by the I/F 409.

The setting unit 501 has a function of setting the target appearance rates Pw and Pc. For example, the setting unit 501 stores into a storage device, the target appearance rates Pw and Pc input via operation of the keyboard 410 and the mouse 411.

The tabulating unit 502 tabulates the appearance frequency of each designated word in the object file group F in which character strings are described. For example, as depicted in FIG. 1, the tabulating unit 502 refers to the basic word structure to search for a basic word having a given single character as the starting character by a longest match search from the given single character. A record of the basic word acquired by the longest match search is added and registered to the basic word appearance frequency table 101. If the basic word has already been added and registered, the addition and registration are not necessary. The tabulating unit 502 then adds one to the appearance frequency in the record of the basic word acquired by the longest match search.

The tabulating unit 502 tabulates the appearance frequency of each single character in the object file group F in which character strings are described. For example, as depicted in FIG. 1, the tabulating unit 502 refers to the single character structure to add and register to the single character appearance frequency table 102, a record for a given single character. If a record has already been added and registered, the addition and registration are not necessary. The tabulating unit 502 then adds one to the appearance frequency in the record of the given single character.

The rank identifying unit 503 identifies for each designated word and based on an appearance frequency tabulated by the tabulating unit 502 for each designated word, a rank in descending order up to a target appearance rate. For example, the rank identifying unit 503 identifies for each basic word set by the setting unit 501, a rank in descending order up to the target appearance rate Pw. Therefore, as described with reference to FIG. 1, the basic word appearance frequency table 101 is sorted in descending order of appearance frequency.

The rank of interest is set to the x-th place and, while x is incremented from x=1, the cumulative appearance frequency of a basic word group ranked first to x-th is divided by the total appearance frequency of all the basic words to calculate an appearance rate up to the x-th place. If the calculated appearance rate is within the target appearance rate Pw, x is incremented to calculate an appearance rate up to the x-th place again.

If the target appearance rate Pw is exceeded, x is decremented by one to identify the rank (value of x after decrement) within the target appearance rate Pw. As a result, the basic word group from the basic word of the first place to the basic word of the rank corresponding to the target appearance rate Pw in descending order of appearance frequency is defined as the specific basic word group.

The rank identifying unit 503 identifies for each single characters and based on an appearance frequency tabulated by the tabulating unit 502 for each single character, a rank in descending order up to a target appearance rate. For example, the rank identifying unit 503 identifies for each of the single characters set by the setting unit 501, a rank in descending order up to the target appearance rate Pc. Therefore, as described with reference to FIG. 1, the single character appearance frequency table 102 is sorted in descending order of appearance frequency.

The rank of interest is set to the y-th place and, while y is incremented from y=1, the cumulative appearance frequency of a single character group ranked first to y-th is divided by the total appearance frequency of all the single characters to calculate an appearance rate up to the y-th place. If the calculated appearance rate is within the target appearance rate Pc, y is incremented to calculate an appearance rate up to the y-th place again.

If the target appearance rate Pc is exceeded, y is decremented by one to identify the rank (value of y after decrement) within the target appearance rate Pc. As a result, the single character group from the single character of the first place to the single character of the rank corresponding to the target appearance rate Pc in descending order of appearance frequency is defined as the specific single character group.

The detecting unit 504 detects in an object file selected from among the object file group F, specific designated words among the ranks identified, in descending order up to a target appearance rate, by the rank identifying unit 503. For example, a given single character within the object file is shifted one-by-one from the top. At this time, a specific basic word having the given single character as the starting character is detected by the longest match search from the specific basic word group identified by the rank identifying unit 503.

The detecting unit 504 detects in an object file selected from among the object file group F, specific single characters among the ranks identified by the rank identifying unit 503. For example, given single characters within the object file is shifted one-by-one from the top. At this time, a given single character matching a specific single character identified by the rank identifying unit 503 is detected.

The dividing unit 505 divides into upper bits and lower bits, the character code of a single character ranked lower than the ranks identified by the rank identifying unit 503. For example, as depicted in FIG. 2, a nonspecific single character is divided into divided character code, including an upper bit character code of the eight upper bits and a lower bit character code of the eight lower bits.

The generating unit 506 generates for each of the specific designated words detected by the detecting unit 504, index information indicating the presence/absence of the specific designated word in each object file. For example, the generating unit 506 generates the specific basic word appearance map M1 indicating the presence/absence of the specific basic words in each object file for each of the specific basic words detected by the detecting unit 504.

The generating unit 506 generates for each of the specific single characters detected by the detecting unit 504, index information indicating the presence/absence of the specific single character in each object file. For example, the generating unit 506 generates the specific single character appearance map M2 indicating the presence/absence of the specific single characters in each object file for each of the specific single characters detected by the detecting unit 504.

The generating unit 506 generates for each upper bit character code obtained by the dividing unit 505, index information (the upper bit character code appearance map M3) indicating the presence/absence of upper bit character code in each object file. The generating unit 506 generates for each of lower bit character code obtained by the dividing unit 505, index information (the lower bit character code appearance map M4) indicating the presence/absence of the lower bit character code in each object file.

The generating unit 506 generates for each of the multi-character strings, index information (the multi-character string appearance map M5) indicating the presence/absence of the multi-character string in each object file. A multi-character string includes, for example, a multi-character string of specific single characters among the ranks identified by the rank identifying unit 503 or a multi-character string that is a mixture of a specific single character and a divided character. For example, a two-character string includes a two-character string of specific single characters.

A two-character string includes a multi-character string that is a sequence of a specific single character and an upper bit character code in this order. A two-character string includes a multi-character string that is a sequence of a lower bit character code and a specific single character in this order. A two-character string includes a multi-character string that is a sequence of an upper bit character code and a lower bit character code in this order (i.e., a nonspecific divided character). A two-character string includes a multi-character string that is a sequence of a lower bit character code and an upper bit character code in this order (i.e., a boundary of two nonspecific divided characters). In the multi-character string appearance map M5, a bit is turned on for an object file in which such a multi-character string appears.

An example of map generation will be described. In this example, the number of connected characters in a multi-character string is two. In the map generation, when a single character, a two-character string, or a basic word appears for the first time, a map thereof (a string of n bits for the file numbers of 1 to n (values are "0")) is generated and the bit of a current object file Fi is turned on. On the other hand, if the map has already been generated for objective files F1 to F(i−1), the bit of the current object file Fi is turned on.

FIG. 6 is an explanatory diagram of a map generation example (part 1). In FIG. 6, it is assumed that a character string 私の結婚活 動の記録 is described in the object file Fi. In the map generation, a starting character is defined as the object character, which is shifted one-by-one toward the end. In FIG. 6, a character indicated by an arrow is the object character.

(A) First, a starting character "私" is the object character. The object character "私" is a specific single character and therefore, the specific single character appearance map M2 of the specific single character "私" is specified. The bit of the object file Fi is turned on ("0"→"1") in the specific single character appearance map M2 of the specific single character "私". Since this is the starting character, the two-character string appearance map M5 is not generated. A longest match search for a specific basic word having the object character "私" as the starting character is performed for "私の結婚活動の記録" having the object character "私" as the starting character. Since no longest matching specific basic word exists in this case, the specific basic word appearance map M1 is not generated.

(B) The object character is shifted by one character to define "の" as the object character. The object character "の" is a specific single character and therefore, the specific single character appearance map M2 of the specific single character "の" is specified. The bit of the object file Fi is turned on ("0"→"1") in the specific single character appearance map M2 of the specific single character "の". Since a two-character string "私の" is acquired when the object character is shifted to "の", the two-character string appearance map M5 of the two-character string "私の" is specified.

The bit of the object file Fi is turned on ("0"→"1") in the two-character string appearance map M5 of the two-character string "私の". A longest match search for a specific basic word having the object character "の" as the starting character is performed for "の結婚活動の記録" having the object character "の" as the starting character. Since no longest matching specific basic word exists in this case, the specific basic word appearance map M1 is not generated.

(C) The object character is shifted by one character to define "結" as the object character. The object character "結" is a specific single character and therefore, the specific single character appearance map M2 of the specific single character "結" is specified. The bit of the object file Fi is turned on ("0"→"1") in the specific single character appearance map M2 of the specific single character "結". Since a two-character string "の結" is acquired when the object character is shifted to "結", the two-character string appearance map M5 of the two-character string "の結" is specified.

The bit of the object file Fi is turned on ("0"→"1") in the two-character string appearance map M5 of the two-character string "の結". A longest match search for a specific basic word having the object character "結" as the starting character is performed for "結婚活動の記録" having the object character "結" as the starting character. Since "結婚" is retrieved as the longest match in this case, the specific basic word appearance map M1 of the specific basic word "結婚" is specified. The bit of the object file Fi is turned on ("0"→"1") in the specific basic word appearance map M1 of the specific basic word "結婚".

(D) The object character is shifted by one character to define "婚" as the object character. The object character "婚" is a specific single character and therefore, the specific single character appearance map M2 of the specific single character "婚" is specified. The bit of the object file Fi is turned on ("0"→"1") in the specific single character appearance map M2 of the specific single character "婚". Since a two-character string "結婚" is acquired when the object character is shifted to "婚", the two-character string appearance map M5 of the two-character string "結婚" is specified.

The bit of the object file Fi is turned on ("0"→"1") in the two-character string appearance map M5 of the two-character string "結婚". A longest match search for a specific basic word having the object character "婚" as the starting character is performed for "婚活動の記録" having the object character "婚" as the starting character. Since no longest matching specific basic word exists in this case, the specific basic word appearance map M1 is not generated.

(E) The object character is shifted by one character to define "活" as the object character. The object character "活" is a specific single character and therefore, the specific single character appearance map of the specific single character "活" is specified. The bit of the object file Fi is turned on ("0"→"1") in the specific single character appearance map M2 of the specific single character "活". Since a two-character string "婚活" is acquired when the object character is shifted to "活", the two-character string appearance map M5 of the two-character string "婚活" is specified.

The bit of the object file Fi is turned on ("0"→"1") in the two-character string appearance map M5 of the two-character string "婚活". A longest match search for a specific basic word having the object character "活" as the starting character is performed for "活動の記録" having the object character "活" as the starting character. Since "活動" is retrieved as the longest match in this case, the specific basic word appearance map M1 of the specific basic word "活動" is specified. The bit of the object file Fi is turned on ("0"→"1") in the specific basic word appearance map M1 of the specific basic word "活動".

(F) The object character is shifted by one character to define "動" as the object character. The object character "動" is a specific single character and therefore, the specific single character appearance map M2 of the specific single character "動" is specified. The bit of the object file Fi is turned on ("0"→"1") in the specific single character appearance map M2 of the specific single character "動". Since a two-character string "活動" is acquired when the object character is shifted to "動", the two-character string appearance map M5 of the two-character string "活動" is specified.

The bit of the object file Fi is turned on ("0"→"1") in the two-character string appearance map M5 of the two-character string "活動". A longest match search for a specific basic word having the object character "動" as the starting character is performed for "動の記録" having the object character "動" as the starting character. Since no longest matching specific basic word exists in this case, the specific basic word appearance map M1 is not generated.

(G) The object character is shifted by one character to define "の" as the object character. The object character "の" is a specific single character and, therefore, the specific single character appearance map M2 of the specific single character "の" is specified. Since the bit of the object file Fi is already turned on at (B) in the specific single character appearance map M2 of the object character "の", nothing is done. Since a two-character string "動の" is acquired when the object character is shifted to "の", the two-character string appearance map M5 of the two-character string "動の" is specified.

The bit of the object file Fi is turned on ("0"→"1") in the two-character string appearance map M5 of the two-character string "動の". A longest match search for a specific basic word having the object character "の" as the starting character is performed for "の記録" having the object character "の" as the starting character. Since no longest matching specific basic word exists in this case, the specific basic word appearance map M1 is not generated.

(H) The object character is shifted by one character to define "記" as the object character. The object character "記" is a specific single character and therefore, the specific single character appearance map of the specific single character "記" is specified. The bit of the object file Fi is turned on ("0"→"1") in the specific single character appearance map M2 of the specific single character "記". Since a two-character string "の記" is acquired when the object character is shifted to "記", the two-character string appearance map M5 of the two-character string "の記" is specified.

The bit of the object file Fi is turned on ("0"→"1") in the two-character string appearance map M5 of the two-character string "の記". A longest match search for a designated basic word having the object character "記" as the starting character is performed on "記録" having the object character "記" as the starting character. Since "記録" is retrieved as the longest match in this case, the specific basic word appearance map M1 of the specific basic word "記録" is specified. The bit of the object file Fi is turned on ("0"→"1") in the specific basic word appearance map M1 of the specific basic word "記録".

(I) The object character is shifted by one character to define "録" as the object character. The object character "録" is a specific single character and therefore, the specific single character appearance map M2 of the specific single character "録" is specified. The bit of the object file Fi is turned on ("0"→"1") in the specific single character appearance map M2 of the specific single character "録". Since a two-character string "記録" is acquired when the object character is shifted to "録", the two-character string appearance map M5 of the two-character string "記録" is specified.

The bit of the object file Fi is turned on ("0"→"1") in the two-character string appearance map M5 of the two-character string "記録". A longest match search for a specific basic word having the object character "録" as the starting character is performed for "録" having the object character "録" as the starting character. Since no longest matching specific basic word exists in this case, the specific basic word appearance map M1 is not generated.

FIG. 7 is an explanatory diagram of a map generation example (part 2). FIG. 7 depicts a map generation example when a divided character code is involved. If a single character is divided, a divided character code is handled and shifted as one character. In FIG. 7, it is assumed that a character string "竜馬は脱藩した" is described in the object file Fi.

(A) First, a starting character "竜" is the object character. The object character "竜" is a specific single character and therefore, the specific single character appearance map M2 of the specific single character "竜" is specified. The bit of the object file Fi is turned on ("0"→"1") in the specific single character appearance map M2 of the specific single character "竜". Since this is the starting character, the two-character string appearance map M5 is not generated. A longest match search for a specific basic word having the object character "竜" as the starting character is performed for "竜馬は脱藩した" having the object character "竜" as the starting character. Since no longest matching specific basic word exists in this case, the specific basic word appearance map M1 is not generated.

(B) The object character is shifted by one character to define "馬" as the object character. The object character "馬" is a specific single character and therefore, the specific single character appearance map M2 of the specific single character "馬" is specified. The bit of the object file Fi is turned on ("0"→"1") in the specific single character appearance map M2 of the specific single character "馬". Since a two-character string "竜馬" is acquired when the object character is shifted to "馬", the two-character string appearance map M5 of the two-character string "竜馬" is specified.

The bit of the object file Fi is turned on ("0"→"1") in the two-character string appearance map M5 of the two-character string "竜馬". A longest match search for a specific basic word having the object character "馬" as the starting character is performed for "馬は脱藩した" having the object character "馬" as the starting character. Since no longest matching specific basic word exists in this case, the specific basic word appearance map M1 is not generated.

(C) The object character is shifted by one character to define "は" as the object character. The object character "は" is a specific single character and therefore, the specific single character appearance map M2 of the specific single character "は" is specified. The bit of the object file Fi is turned on ("0"→"1") in the specific single character appearance map M2 of the specific single character "は". Since a two-character string "馬は" is acquired when the object character is shifted to "は", the two-character string appearance map M5 of the two-character string "馬は" is specified.

The bit of the object file Fi is turned on ("0"→"1") in the two-character string appearance map M5 of the two-character string "馬は". A longest match search for a specific basic word having the object character "は" as the starting character is performed for "は脱藩した" having the object character "は" as the starting character. Since no longest matching specific basic word exists in this case, the specific basic word appearance map M1 is not generated.

(D) The object character is shifted by one character to define "脱" as the object character. The object character "脱" is not a specific single character and therefore, the character code "0x8131" of the object character "脱" is divided into an upper bit character code "0x81" and a lower bit character code "0x31". The upper bit character code "0x81" is defined as the object character and the upper bit character code appearance map M3 of the upper bit character code "0x81" is specified. The bit of the object file Fi is turned on ("0"→"1") in the upper bit character code appearance map M3 of the upper bit character code "0x81". Since a two-character string "は 0x81" is acquired when the object character is shifted to the upper bit character code "0x81", the two-character string appearance map M5 of the two-character string "は 0x81" is specified.

The bit of the object file Fi is turned on ("0"→"1") in the two-character string appearance map M5 of the two-character string "は 0x81". A longest match search for a specific basic word having the object character "0x81" as the starting character is performed for "0x81 0x31 藩した" having the object character "0x81" as the starting character. Since no longest matching specific basic word exists in this case, the specific basic word appearance map M1 is not generated.

(E) The object character is shifted by one character to define the lower bit character code "0x31" as the object character. The lower bit character code appearance map M4 of the lower bit character code "0x31" is specified. The bit of the object file Fi is turned on ("0"→"1") in the lower bit character code appearance map M4 of the lower bit character code "0x31". Since a two-character string "0x81 0x31" is acquired when the object character is shifted to the lower bit character code "0x31", the two-character string appearance map M5 of the two-character string "0x81 0x31" is specified.

The bit of the object file Fi is turned on ("0"→"1") in the two-character string appearance map M5 of the two-character string "0x81 0x31". A longest match search for a specific basic word having the object character "0x31" as the starting character is performed for "0x31 藩した" having the object character "0x31" as the starting character. Since no longest matching specific basic word exists in this case, the specific basic word appearance map M1 is not generated.

(F) The object character is shifted by one character to define "藩" as the object character. The object character "藩" is not a specific single character and therefore, the character code "0xE985" of the object character "藩" is divided into an upper bit character code "0xE9" and a lower bit character code "0x85". The upper bit character code "0xE9" is defined as the object character and the upper bit character code appearance map M3 of the upper bit character code "0xE9" is specified.

The bit of the object file Fi is turned on ("0"→"1") in the upper bit character code appearance map M3 of the upper bit character code "0xE9". Since a two-character string "0x31 0xE9" is acquired when the object character is shifted to the upper bit character code "0xE9", the two-character string appearance map M5 of the two-character string "0x31 0xE9" is specified.

The bit of the object file Fi is turned on ("0"→"1") in the two-character string appearance map M5 of the two-character string "0x31 0xE9". A longest match search for a specific basic word having the object character "0xE9" as the starting character is performed for "0xE9 0x85 した" having the object character "0xE9" as the starting character. Since no longest matching specific basic word exists in this case, the specific basic word appearance map M1 is not generated.

(G) The object character is shifted by one character to define the lower bit character code "0x85" as the object character. The lower bit character code appearance map M4 of the lower bit character code "0x85" is specified. The bit of the object file Fi is turned on ("0"→"1") in the lower bit character code appearance map M4 of the lower bit character code "0x85". Since a two-character string "0xE90x85" is acquired when the object character is shifted to the lower bit character code "0x85", the two-character string appearance map M5 of the two-character string "0xE9 0x85" is specified.

The bit of the object file Fi is turned on ("0"→"1") in the two-character string appearance map M5 of the two-character string "0xE9 0x85". A longest match search for a specific basic word having the object character "0x85" as the starting character is performed for "0x85した" having the object character "0x85" as the starting character. Since no longest matching specific basic word exists in this case, the specific basic word appearance map M1 is not generated.

(H) The object character is shifted by one character to define "し" as the object character. The object character "し" is a specific single character and therefore, the specific single character appearance map M2 of the specific single character "し" is specified. The bit of the object file Fi is turned on ("0"→"1") in the specific single character appearance map M2 of the specific single character "し". Since a two-character string "0x85 し" is acquired when the object character is shifted to "し" the two-character string appearance map M5 of the two-character string "0x85 し" is specified.

The bit of the object file Fi is turned on ("0"→"1") in the two-character string appearance map M5 of the two-character string "0x85 し". A longest match search for a specific basic word having the object character "し" as the starting character is performed for "した" having the object character "し" as the starting character. Since no longest matching specific basic word exists in this case, the specific basic word appearance map M1 is not generated.

(I) The object character is shifted by one character to define "た" as the object character. The object character "た" is a specific single character and therefore, the specific single character appearance map M2 of the specific single character "た" is specified. The bit of the object file Fi is turned on ("0"→"1") in the specific single character appearance map M2 of the specific single character "た". Since a two-character string "した" is acquired when the object character is shifted to "た", the two-character string appearance map M5 of the two-character string "した" is specified.

The bit of the object file Fi is turned on ("0"→"1") in the two-character string appearance map M5 of the two-character string "した". A longest match search for a specific basic word having the object character "た" as the starting character is performed for "た" having the object character "た" as the starting character. Since no longest matching specific basic word exists in this case, the specific basic word appearance map M1 is not generated.

FIGS. 8A and 8B are explanatory diagrams of a map generation example (part 3). In FIGS. 8A and 8B, it is assumed that an alphabetic character string "that□is□a□pen" is described in the object file Fi. In this example, "□" denotes a blank. A blank is handled as one character.

(A) First, a starting character "t" is the object character. The object character "t" is a specific single character and therefore, the specific single character appearance map M2 of the specific single character "t" is specified. The bit of the object file Fi is turned on ("0"→"1") in the specific single character appearance map M2 of the specific single character "t". Since this is the starting character, the two-character string appearance map M5 is not generated.

A longest match search for a specific basic word having the object character "t" as the starting character is performed for "that□is□a□pen" having the object character "t" as the starting character. Since "that" (pronoun) is retrieved as the longest match in this case, the specific basic word appearance map M1 of the specific basic word "that" is specified. The bit of the object file Fi is turned on ("0"→"1") in the specific basic word appearance map M1 of the specific basic word "that".

(B) The object character is shifted by one character to define "h" as the object character. The object character "h" is a specific single character and therefore, the specific single character appearance map M2 of the specific single character "h" is specified. The bit of the object file Fi is turned on ("0"→"1") in the specific single character appearance map M2 of the specific single character "h". Since a two-character string "th" is acquired when the object character is shifted to "h", the two-character string appearance map M5 of the two-character string "th" is specified.

The bit of the object file Fi is turned on ("0"→"1") in the two-character string appearance map M5 of the two-character string "th". Since a forward match search is emphasized in the case of English words, a longest match search for a specific basic word is not performed from the middle of a character string of an English word.

(C) The object character is shifted by one character to define "a" as the object character. The object character "a" is a specific single character and therefore, the specific single character appearance map M2 of the specific single character "a" is specified. The bit of the object file Fi is turned on ("0"→"1") in the specific single character appearance map M2 of the specific single character "a". Since a two-character string "ha" is acquired when the object character is shifted to "a", the two-character string appearance map M5 of the two-character string "ha" is specified.

The bit of the object file Fi is turned on ("0"→"1") in the two-character string appearance map M5 of the two-character string "ha".

(D) The object character is shifted by one character to define "t" as the object character. The object character "t" is a specific single character and therefore, the specific single character appearance map M2 of the specific single character "t" is specified. Since the bit of the object file Fi is already turned on at (A) in the specific single character appearance map M2 of the object character "t", nothing is changed. Since a two-character string "at" is acquired when the object character is shifted to "t", the two-character string appearance map M5 of the two-character string "at" is specified.

The bit of the object file Fi is turned on ("0"→"1") in the two-character string appearance map M5 of the two-character string "at".

(E) The object character is shifted by one character to define "□" as the object character. The object character "□" is a specific single character and therefore, the specific single character appearance map M2 of the specific single character "□" is specified. The bit of the object file Fi is turned on ("0"→"1") in the specific single character appearance map M2 of the specific single character "□". Since a two-character string "□" is acquired when the object character is shifted to "□", the two-character string appearance map M5 of the two-character string "t□" is specified.

The bit of the object file Fi is turned on ("0"→"1") in the two-character string appearance map M5 of the two-character string "t□".

(F) The object character is shifted by one character to define "i" as the object character. The object character "i" is a specific single character and therefore, the specific single character appearance map M2 of the specific single character "i" is specified. The bit of the object file Fi is turned on ("0"→"1") in the specific single character appearance map M2 of the specific single character "i". Since a two-character string "□i" is acquired when the object character is shifted to "i", the two-character string appearance map M5 of the two-character string "□i" is specified.

The bit of the object file Fi is turned on ("0"→"1") in the two-character string appearance map M5 of the two-character string "□i". A longest match search for a specific basic word having the object character "i" as the starting character is performed for "□is□a□pen" having the object character "i" as the starting character. Since "is" (substantive verb) is retrieved as the longest match in this case, the specific basic word appearance map M1 of the specific basic word "is" is specified. The bit of the object file Fi is turned on ("0"→"1") in the specific basic word appearance map M1 of the specific basic word "is".

(G) The object character is shifted by one character to define "s" as the object character. The object character "s" is a specific single character and therefore, the specific single character appearance map M2 of the specific single character "s" is specified. The bit of the object file Fi is turned on ("0"→"1") in the specific single character appearance map M2 of the specific single character "s". Since a two-character string "is" is acquired when the object character is shifted to "s", the two-character string appearance map M5 of the two-character string "is" is specified.

The bit of the object file Fi is turned on ("0"→"1") in the two-character string appearance map M5 of the two-character string "is".

(H) The object character is shifted by one character to define "□" as the object character. The object character "□" is a specific single character and therefore, the specific single character appearance map M2 of the specific single character "□" is specified. Since the bit of the object file Fi is already turned on at (E) in the specific single character appearance map M2 of the object character "□", nothing is changed. Since a two-character string "□" is acquired when the object character is shifted to "□", the two-character string appearance map M5 of the two-character string "s□" is specified.

The bit of the object file Fi is turned on ("0"→"1") in the two-character string appearance map M5 of the two-character string "s□".

(I) The object character is shifted by one character to define "a" as the object character. The object character "a" is a specific single character and therefore, the specific single character appearance map M2 of the specific single character "a" is specified. Since the bit of the object file Fi is already turned on at (C) in the specific single character appearance map M2 of the object character "a", nothing is changed. Since a two-character string "□a" is acquired when the object character is shifted to "a", the two-character string appearance map M5 of the two-character string "□a" is specified.

The bit of the object file Fi is turned on ("0"→"1") in the two-character string appearance map M5 of the two-character string "□a". A longest match search for a specific basic word having the object character "a" as the starting character is performed for "a□pen" having the object character "a" as the starting character. Since "a" (indefinite article) is retrieved as the longest match in this case, the specific basic word appearance map M1 of the specific basic word "a" is specified. The bit of the object file Fi is turned on ("0"→"1") in the specific basic word appearance map M1 of the specific basic word "a".

(J) The object character is shifted by one character to define "□" as the object character. The object character "□" is a specific single character and therefore, the specific single character appearance map M2 of the specific single character "□" is specified. Since the bit of the object file Fi is already turned on at (E) in the specific single character appearance map M2 of the object character "□", nothing is done. Since a two-character string "a□" is acquired when the object character is shifted to "□", the two-character string appearance map M5 of the two-character string "a□" is specified.

The bit of the object file Fi is turned on ("0"→"1") in the two-character string appearance map M5 of the two-character string "a□".

(K) The object character is shifted by one character to define "p" as the object character. The object character "p" is a specific single character and therefore, the specific single character appearance map M2 of the specific single character "p" is specified. The bit of the object file Fi is turned on ("0"→"1") in the specific single character appearance map M2 of the specific single character "p". Since a two-character string "□p" is acquired when the object character is shifted to "p", the two-character string appearance map M5 of the two-character string "□p" is specified.

The bit of the object file Fi is turned on ("0"→"1") in the two-character string appearance map M5 of the two-character string "□p". A longest match search for a specific basic word having the object character "p" as the starting character is performed for "pen" having the object character "p" as the starting character. Since "pen" (pen) is retrieved as the longest match in this case, the specific basic word appearance map M1 of the specific basic word "pen" is specified. The bit of the object file Fi is turned on ("0"→"1") in the specific basic word appearance map M1 of the specific basic word "pen".

(L) The object character is shifted by one character to define "e" as the object character. The object character "e" is a specific single character and therefore, the specific single character appearance map M2 of the specific single character "e" is specified. The bit of the object file Fi is turned on ("0"→"1") in the specific single character appearance map M2 of the specific single character "e". Since a two-character string "pe" is acquired when the object character is shifted to "e", the two-character string appearance map M5 of the two-character string "pe" is specified.

The bit of the object file Fi is turned on ("0"→"1") in the two-character string appearance map M5 of the two-character string "pe".

(M) The object character is shifted by one character to define "n" as the object character. The object character "n" is a specific single character and therefore, the specific single character appearance map M2 of the specific single character "n" is specified. The bit of the object file Fi is turned on ("0"→"1") in the specific single character appearance map M2 of the specific single character "n". Since a two-character string "en" is acquired when the object character is shifted to "n", the two-character string appearance map M5 of the two-character string "en" is specified.

The bit of the object file Fi is turned on ("0"→"1") in the two-character string appearance map M5 of the two-character string "en".

FIG. 9 is explanatory diagram of a map generation example (part 4). In FIG. 9, it is assumed that an English word "internal" is described in the object file Fi.

(A) First, a starting character "i" is the object character. The object character "i" is a specific single character and therefore, the specific single character appearance map M2 of the specific single character "i" is specified. The bit of the object file Fi is turned on ("0"→"1") in the specific single character appearance map M2 of the specific single character "i". Since this is the starting character, the two-character string appearance map M5 is not generated. A longest match search for a specific basic word having the object character "i" as the starting character is performed for "internal" having the object character "i" as the starting character.

Although "internal" is not a specific basic word and is not retrieved as the longest match, "inter" (inter) is retrieved as the longest match in this case and therefore, the specific basic word appearance map M1 of the specific basic word "inter" is specified. The bit of the object file Fi is turned on ("0"→"1") in the specific basic word appearance map M1 of the specific basic word "inter".

(B) The object character is shifted by one character to define "n" as the object character. The object character "n" is a specific single character and therefore, the specific single character appearance map M2 of the specific single character "n" is specified. The bit of the object file Fi is turned on ("0"→"1") in the specific single character appearance map M2 of the specific single character "n". Since a two-character string "in" is acquired when the object character is shifted to "n", the two-character string appearance map M5 of the two-character string "in" is specified.

The bit of the object file Fi is turned on ("0"→"1") in the two-character string appearance map M5 of the two-character string "in".

(C) The object character is shifted by one character to define "t" as the object character. The object character "t" is a specific single character and therefore, the specific single character appearance map M2 of the specific single character "t" is specified. The bit of the object file Fi is turned on ("0"→"1") in the specific single character appearance map M2 of the specific single character "t". Since a two-character string "nt" is acquired when the object character is shifted to "t", the two-character string appearance map M5 of the two-character string "nt" is specified.

The bit of the object file Fi is turned on ("0"→"1") in the two-character string appearance map M5 of the two-character string "nt".

(D) The object character is shifted by one character to define "e" as the object character. The object character "e" is a specific single character and therefore, the specific single character appearance map M2 of the specific single character "e" is specified. Since a two-character string "te" is acquired when the object character is shifted to "e", the two-character string appearance map M5 of the two-character string "te" is specified.

The bit of the object file Fi is turned on ("0"→"1") in the two-character string appearance map M5 of the two-character string "te".

(E) The object character is shifted by one character to define "r" as the object character. The object character "r" is a specific single character and therefore, the specific single character appearance map M2 of the specific single character "r" is specified. The bit of the object file Fi is turned on ("0"→"1") in the specific single character appearance map M2 of the specific single character "r". Since a two-character string "er" is acquired when the object character is shifted to "r", the two-character string appearance map M5 of the two-character string "er" is specified.

The bit of the object file Fi is turned on ("0"→"1") in the two-character string appearance map M5 of the two-character string "er".

(F) The object character is shifted by one character to define "n" as the object character. The object character "n" is a specific single character and therefore, the specific single character appearance map M2 of the specific single character "n" is specified. Since the bit of the object file Fi is already turned on at (B) in the specific single character appearance map M2 of the object character "n", nothing is changed. Since a two-character string "rn" is acquired when the object character is shifted to "n", the two-character string appearance map M5 of the two-character string "rn" is specified.

The bit of the object file Fi is turned on ("0"→"1") in the two-character string appearance map M5 of the two-character string "rn".

(G) The object character is shifted by one character to define "a" as the object character. The object character "a" is a specific single character and therefore, the specific single character appearance map M2 of the specific single character "a" is specified. The bit of the object file Fi is turned on ("0"→"1") in the specific single character appearance map M2 of the specific single character "a". Since a two-character string "na" is acquired when the object character is shifted to "a", the two-character string appearance map M5 of the two-character string "na" is specified.

The bit of the object file Fi is turned on ("0"→"1") in the two-character string appearance map M5 of the two-character string "na".

(H) Lastly, the object character is shifted by one character to define "l" as the object character. The object character "l" is a specific single character and therefore, the specific single character appearance map M2 of the specific single character "l" is specified. The bit of the object file Fi is turned on ("0"→"1") in the specific single character appearance map M2 of the specific single character "l". Since a two-character string "al" is acquired when the object character is shifted to "l", the two-character string appearance map M5 of the two-character string "al" is specified.

The bit of the object file Fi is turned on ("0"→"1") in the two-character string appearance map M5 of the two-character string "al".

Figure 10:
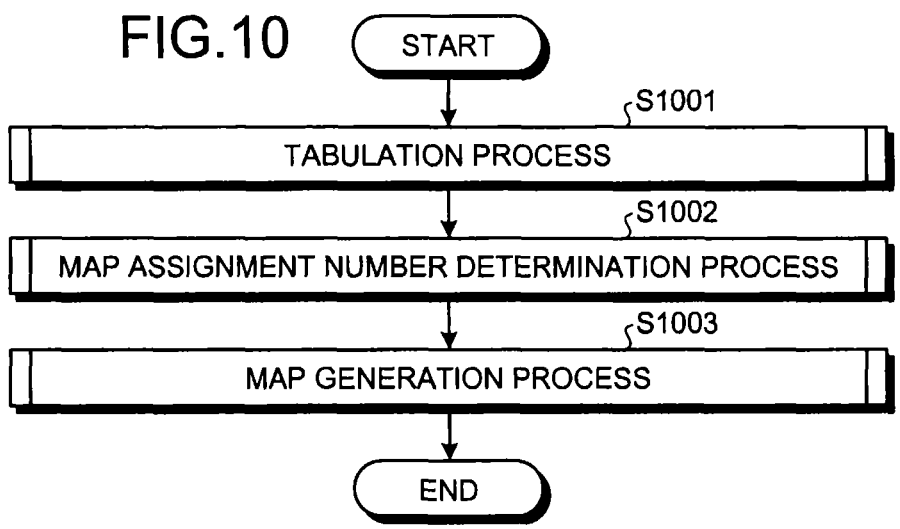
FIG. 10 is a flowchart of an information generation process procedure of an information generating apparatus 500.

FIG. 10 is a flowchart of an information generation process procedure of the information generating apparatus 500. The information generating apparatus 500 executes a tabulation process (step S1001), a map assignment number determination process (step S1002), and a map generation process (step S1003). Details of the tabulation process (step S1001), the map assignment number determination process (step S1002), and the map generation process (step S1003) will be described later.

Figure 11:
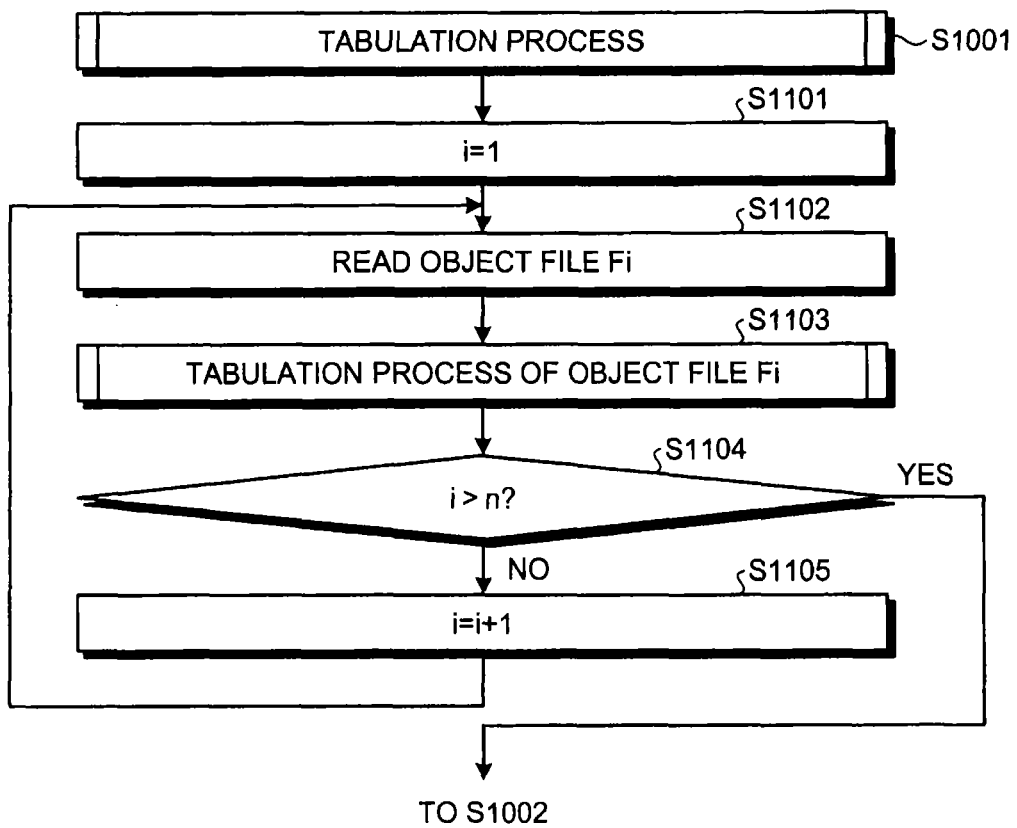
FIG. 11 is a flowchart of a detailed process procedure of a tabulation process (step S1001) depicted in FIG. 10.

FIG. 11 is a flowchart of a detailed process procedure of the tabulation process (step S1001) depicted in FIG. 10. First, the information generating apparatus 500 sets a file number i to i=1 (step S1101) and reads the object file Fi (step S1102). The information generating apparatus 500 executes a tabulation process for the object file Fi (step S1103). The information generating apparatus 500 determines whether the file number i satisfies i>n (n is the total number of the object files F1 to Fn) (step S1104).

If i>n is not satisfied (step S1104: NO), the information generating apparatus 500 increments i (step S1105) and returns to step S1102. On the other hand, if i>n is satisfied (step S1104: YES), the information generating apparatus 500 goes to the map assignment number determination process (step S1002) and terminates the tabulation process (step S1001). With this tabulation process (step S1001), the tabulation process for the object file Fi (step S1103) can be executed for each of the object files Fi.

Figure 12:
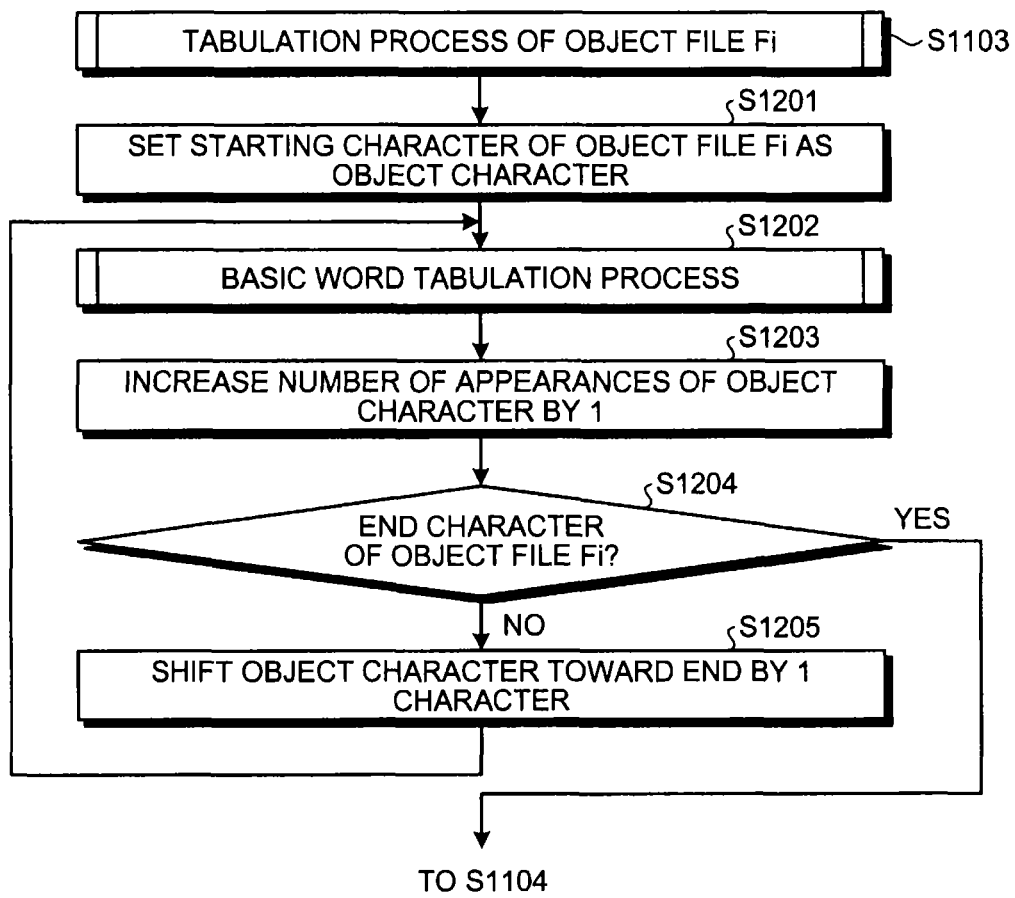
FIG. 12 is a flowchart of a detailed process procedure of a tabulation process for an object file Fi (step S1103) depicted in FIG. 11.

FIG. 12 is a flowchart of a detailed process procedure of the tabulation process for the object file Fi (step S1103) depicted in FIG. 11. First, the information generating apparatus 500 sets the starting character of the object file Fi as the object character (step S1201) and executes a basic word tabulation process (step S1202). The information generating apparatus 500 then increases the number of appearances of the object character by one in the single character appearance frequency table 102 (step S1203). The information generating apparatus 500 determines whether the object character is the end character of the object file Fi (step S1204).

If the object character is not the end character of the object file Fi (step S1204: NO), the information generating apparatus 500 shifts the object character toward the end by one character (step S1205) and returns to step S1202. On the other hand, if the object character is the end character of the object file Fi (step S1204: YES), the information generating apparatus 500 goes to step S1104 and terminates the tabulation process for the object file Fi (step S1103). With this tabulation process for the object file Fi (step S1103), the appearance frequencies of the basic words and the single characters present in the object file group F can be tabulated.

Figure 13:
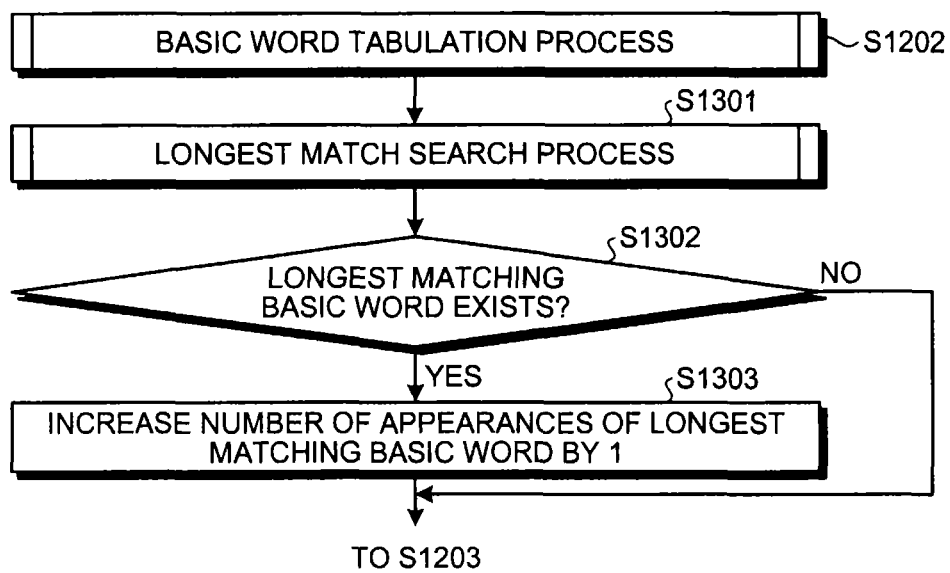
FIG. 13 is a flowchart of a detailed process procedure of a basic word tabulation process (step S1202) depicted in FIG. 12.

FIG. 13 is a flowchart of a detailed process procedure of the basic word tabulation process (step S1202) depicted in FIG. 12. The information generating apparatus 500 executes a longest match search process (step S1301) and determines whether a longest matching basic word exists (step S1302). If a longest matching basic word exists (step S1302: YES), the information generating apparatus 500 increases the number of appearances of the longest matching basic word by one in the basic word appearance frequency table 101 (step S1303) and goes to step S1203.

On the other hand, if no longest matching basic word exists (step S1302: NO), the information generating apparatus 500 goes to step S1202. As a result, the basic word tabulation process (step S1202) is terminated. With this basic word tabulation process (step S1202), since the basic words can be counted by the longest match search process (step S1301), a basic word of a longer character string can preferentially be counted.

Figure 14:
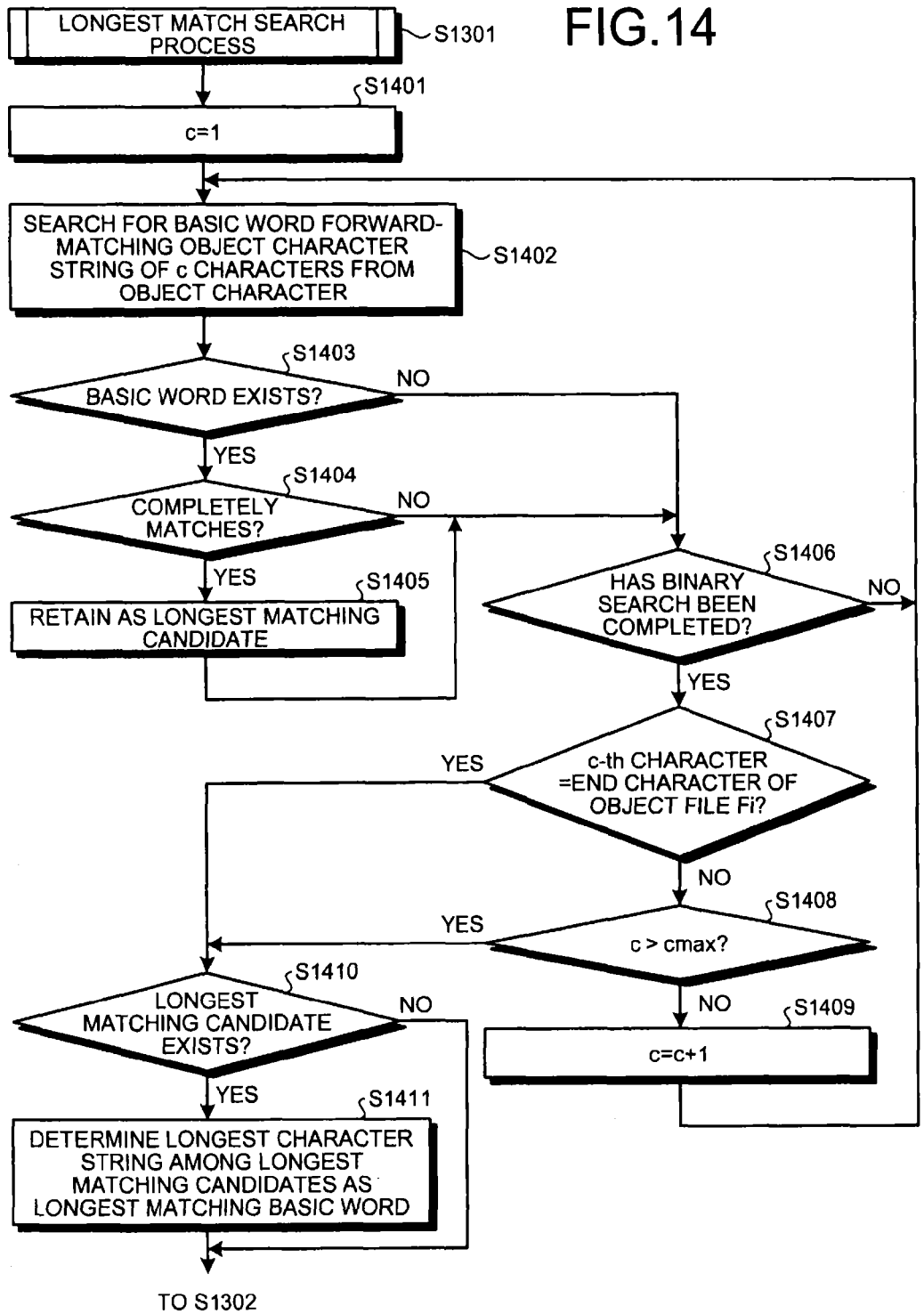
FIG. 14 is a flowchart of a detailed process procedure of a longest match search process (step S1301) depicted in FIG. 13.

FIG. 14 is a flowchart of a detailed process procedure of the longest match search process (step S1301) depicted in FIG. 13. First, the information generating apparatus 500 sets c=1 (step S1401). C is the number of characters from the object character (including the object character). C=1 means only the object character. The information generating apparatus 500 then searches the basic word character structure for a basic word forward-matching an object character string of c characters from the object character (step S1402). The information generating apparatus 500 determines whether a basic word exists from the results of the search (step S1403). If no basic word is hit as a result of the binary search (step S1403: NO), the information generating apparatus 500 goes to step S1406.

On the other hand, if a basic word is hit as a result of the binary search (step S1403: YES), the information generating apparatus 500 determines whether the hit basic word completely matches the object character string (step S1404). If not (step S1404: NO), the information generating apparatus 500 goes to step S1406. On the other hand, if the hit basic word completely matches (step S1404: YES), the information generating apparatus 500 retains in a storage device, the basic word as a longest matching candidate (step S1405) and goes to step S1406.

At step S1406, the information generating apparatus 500 determines whether the binary search has been completed for the object character string (step S1406). For example, the information generating apparatus 500 determines whether the binary search has been performed for the last basic word. If the binary search has not been completed (step S1406: NO), the information generating apparatus 500 goes to step S1402 and continues until the binary search is completed.

On the other hand, if the binary search for the object character string has been completed (step S1406: YES), the information generating apparatus 500 determines whether a c-th character is the end character of the object file Fi (step S1407). If the c-th character is the end character of the object file Fi (step S1407: YES), the information generating apparatus 500 goes to step S1410. On the other hand, if the c-th character is not the end character of the object file Fi (step S1407: NO), the information generating apparatus 500 determines whether c>cmax is satisfied (step S1408). Cmax is a value preliminarily set as the upper limit number of characters of the object character string.

If c>cmax is not satisfied (step S1408: NO), the information generating apparatus 500 increments c (step S1409) and returns to step S1402. On the other hand, if c>cmax is satisfied (step S1408: YES), the information generating apparatus 500 determines whether a longest matching candidate exists (step S1410). For example, the information generating apparatus 500 determines whether at least one longest matching candidate is retained in the memory at step S1405.

If longest matching candidates are present (step S1410: YES), the information generating apparatus 500 determines the longest character string among the longest matching candidates as the longest matching basic word (step S1411). The information generating apparatus 500 goes to step S1302. On the other hand, if no longest matching candidate exists at step S1410 (step S1410: NO), the information generating apparatus 500 goes to step S1302. As a result, the longest match search process (step S1301) is terminated. With this longest match search process (step S1301), the longest character string of the completely matching character strings can be retrieved as a basic word from among the basic words in the basic word structure.

Figure 15:
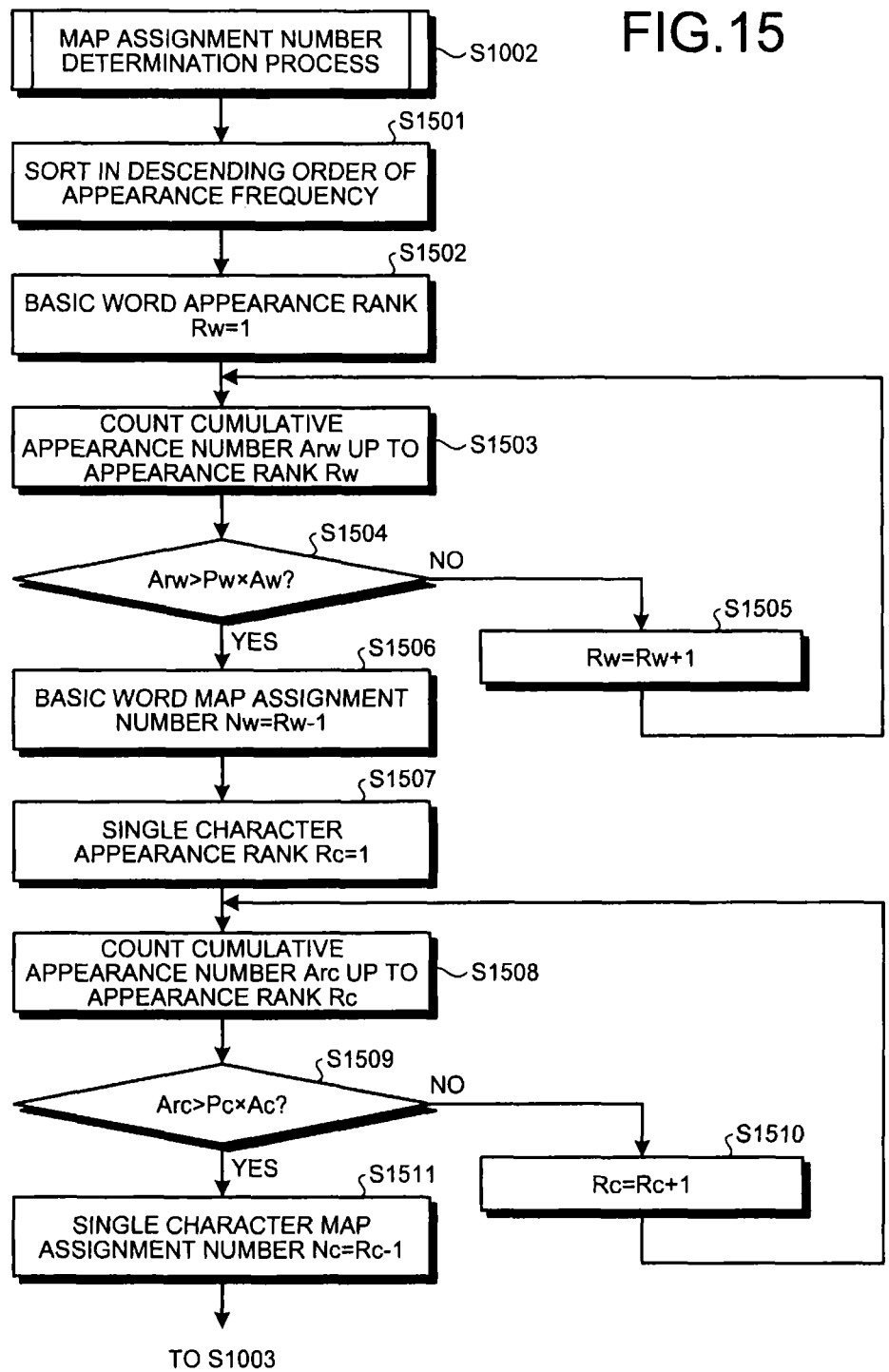
FIG. 15 is a flowchart of a detailed process procedure of a map assignment number determination process (step S1002) depicted in FIG. 10.

FIG. 15 is a flowchart of a detailed process procedure of the map assignment number determination process (step S1002) depicted in FIG. 10. First, the information generating apparatus 500 sorts the basic word appearance frequency table 101 indicating the appearance frequency for each basic word and the single character appearance frequency table 102 indicating the appearance frequency for each single character, obtained from the tabulation process (step S1001) in descending order of appearance frequency (step S1501). The information generating apparatus 500 refers to the sorted basic word appearance frequency table 101, sets an appearance rank Rw of basic words to Rw=1 (step S1502), and counts a cumulative appearance number Arw up to the appearance rank Rw (step S1503). The information generating apparatus 500 determines whether the following expression (1) is satisfied (step S1504).

$$Arw > Pw \times Aw \qquad (1)$$

Where, Aw is the total number of appearances of the tabulated basic words.

If expression (1) is not satisfied (step S1504: NO), the information generating apparatus 500 increments the appearance rank Rw (step S1505) and returns to step S1503. Therefore, the appearance rank Rw is continuously lowered until expression (1) is satisfied.

If expression (1) is satisfied (step S1504: YES), the information generating apparatus 500 sets a map assignment number Nw of the basic words to Nw=Rw−1 (step S1506). The map assignment number Nw means the number of records (lines) of the specific basic word appearance map M1.

The information generating apparatus 500 sets an appearance rank Rc of the single characters to Rc=1 (step S1507) and counts the cumulative appearance number Arc up to the appearance rank Rc (step S1508). The information generating apparatus 500 determines whether the following expression (2) is satisfied (step S1509).

$$Arc > Pc \times Ac \qquad (2)$$

Where, Ac is the total number of appearances of the tabulated single characters.

If expression (2) is not satisfied (step S1509: NO), the information generating apparatus 500 increments the appearance rank Rc (step S1510) and returns to step S1508. Therefore, the appearance rank Rc is continuously lowered until expression (2) is satisfied.

If expression (2) is satisfied (step S1509: YES), the information generating apparatus 500 sets a map assignment number Nc of the single characters to Nc=Rc−1 (step S1511). The map assignment number Nc means the number of records (lines) of the specific single character appearance map M2. Subsequently, the information generating apparatus 500 goes to the map generation process (step S1003) and terminates the map assignment number determination process (step S1002).

With the map assignment number determination process (step S1002), the specific basic word appearance map M1 can be generated for the number of basic words corresponding to the target appearance rate Pw. Therefore, since it is not necessary to assign all the basic words to the map and the assignment is determined according to the target appearance rate Pw, the map size can be optimized.

For the single characters, the specific single character appearance map M2 can be generated for the number of single characters corresponding to the target appearance rate Pc. Therefore, since it is not necessary to assign all the single characters to the map and the assignment is determined according to the target appearance rate Pc, the map size can be optimized.

Figure 16:
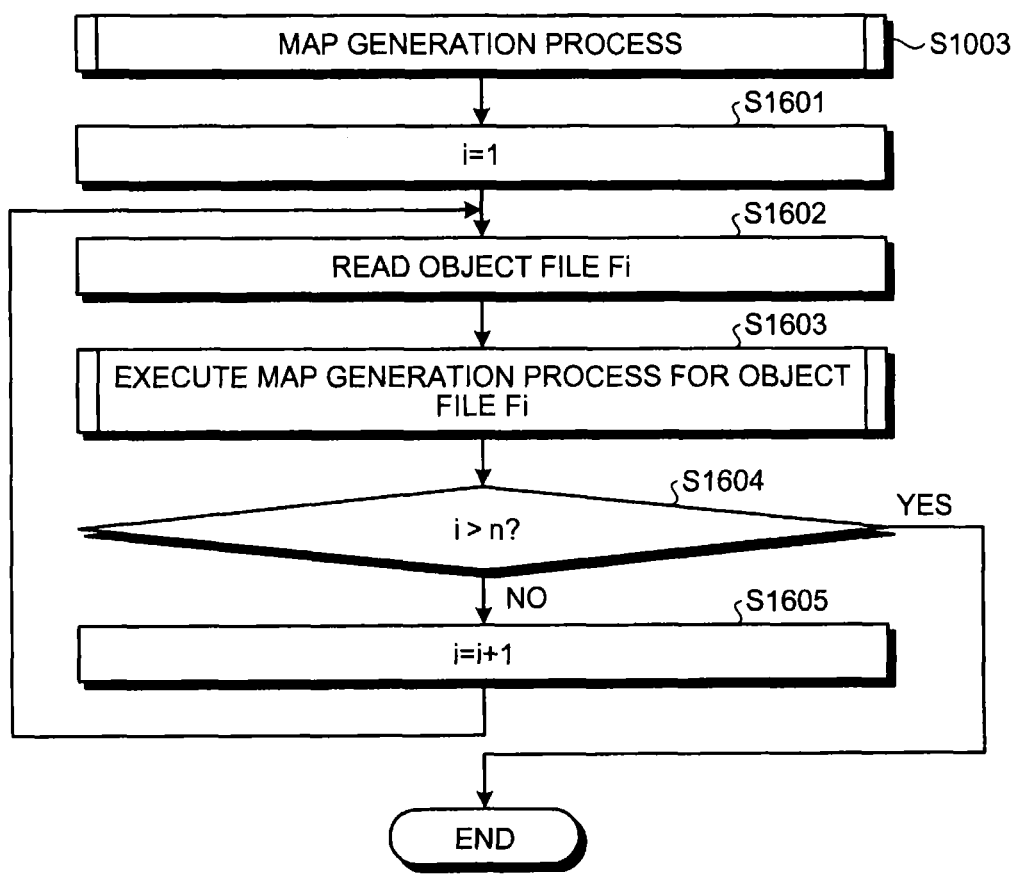
FIG. 16 is a flowchart of a detailed process procedure of a map generation process (step S1003) depicted in FIG. 10.

FIG. 16 is a flowchart of a detailed process procedure of the map generation process (step S1003) depicted in FIG. 10. First, the information generating apparatus 500 sets the file number i to i=1 (step S1601) and reads the object file Fi (step S1602). The information generating apparatus 500 executes the map generation process for the object file Fi (step S1603). The information generating apparatus 500 then determines whether the file number i satisfies i>n (n is the total number of the object files F1 to Fn) (step S1604).

If i>n is not satisfied (step S1604: NO), the information generating apparatus 500 increments i (step S1605) and returns to step S1602. On the other hand, if i>n is satisfied (step S1604: YES), the map generation process (step S1003) is terminated. With this map generation process (step S1003), the map generation process of the object file Fi (step S1603) can be executed for each of the object files Fi.

Figure 17:
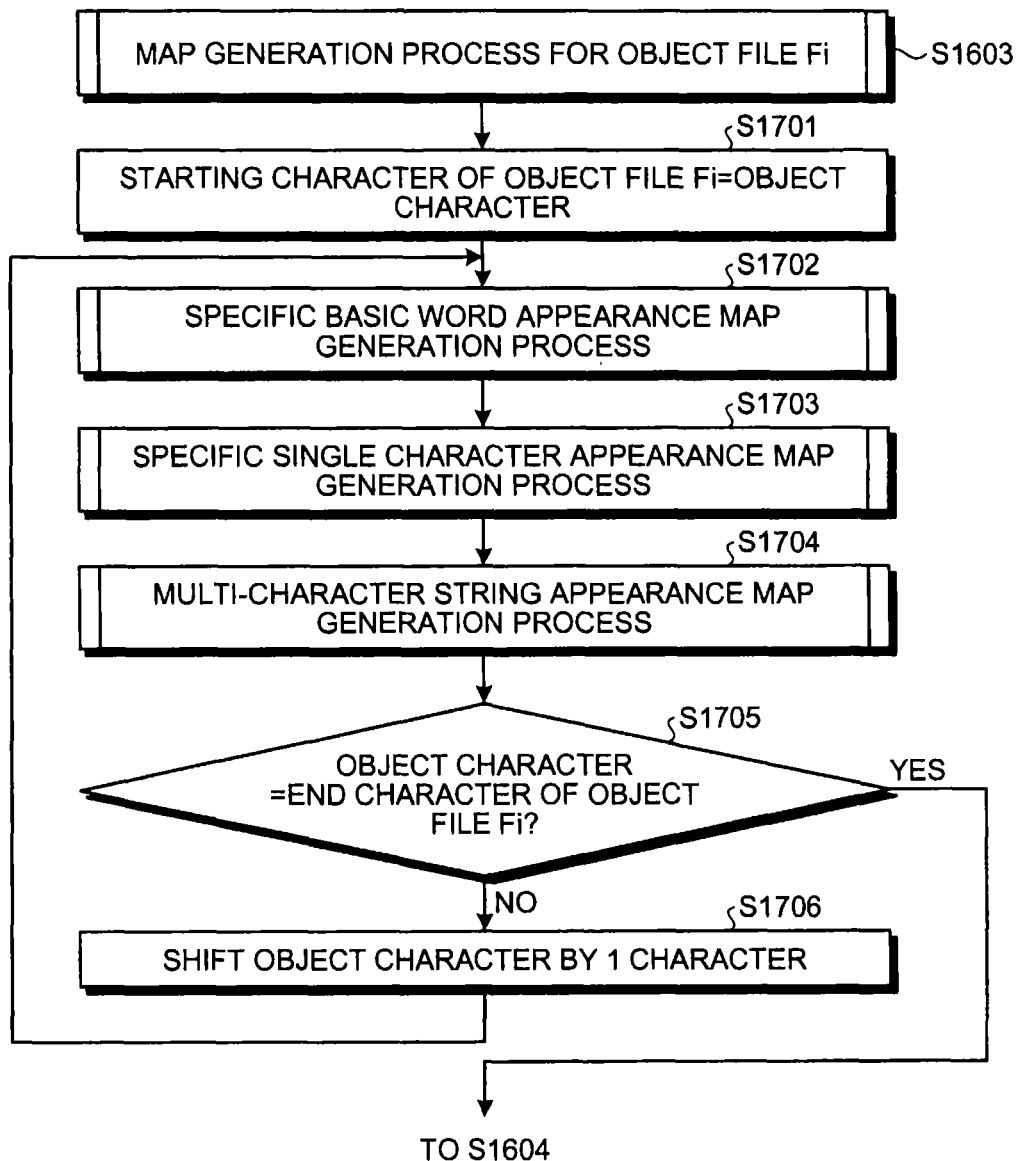
FIG. 17 is a flowchart of a detailed process procedure of a map generation process for the object file Fi (step S1603) depicted in FIG. 16.

FIG. 17 is a flowchart of a detailed process procedure of the map generation process for the object file Fi (step S1603) depicted in FIG. 16. First, the information generating apparatus 500 sets the starting character of the object file Fi as the object character (step S1701) and executes a specific basic word appearance map generation process (step S1702), a specific single character appearance map generation process (step S1703), and a multi-character string appearance map generation process (step S1704). The information generating apparatus 500 then determines whether the object character is the end character of the object file Fi (step S1705).

If the object character is not the end character of the object file Fi (step S1705: NO), the information generating apparatus 500 shifts the object character by one character toward the end (step S1706) and returns to step S1702. On the other hand, if the object character is the end character of the object file Fi (step S1705: YES), the information generating apparatus 500 goes to step S1604 and terminates the map generation process of the object file Fi (step S1603).

With this map generation process of the object file Fi (step S1603), the specific basic word appearance map M1, the specific single character appearance map M2, and the multi-character string appearance map M5 can simultaneously be generated in parallel while shifting the object character one-by-one.

Figure 18:
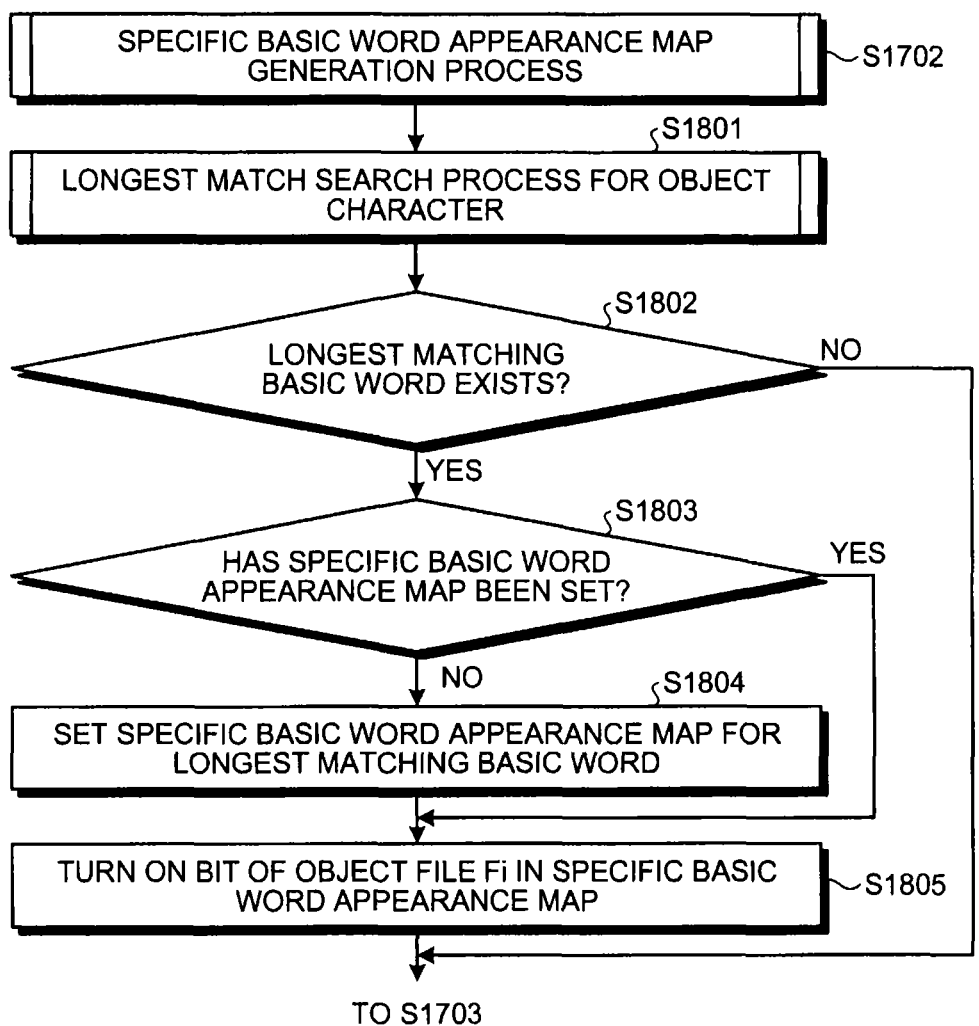
FIG. 18 is a flowchart of a detailed process procedure of a specific basic word appearance map generation process (step S1702) depicted in FIG. 17.

FIG. 18 is a flowchart of a detailed process procedure of the specific basic word appearance map generation process (step S1702) depicted in FIG. 17. First, the information generating apparatus 500 executes a longest match search process for the object character (step S1801). A detailed process procedure of the longest match search process (step S1801) has the same process contents as the longest match search process (step S1301) depicted in FIG. 14.

The information generating apparatus 500 determines whether a longest matching basic word, i.e., a specific basic word exists (step S1802). If no longest matching basic word exists (step S1802: NO), the information generating apparatus 500 goes to the specific single character appearance map generation process (step S1703). On the other hand, if a longest matching basic word exists (step S1802: YES), the information generating apparatus 500 determines whether the specific basic word appearance map M1 has been set for the longest matching basic word (step S1803).

If the specific basic word appearance map M1 has been set (step S1803: YES), the information generating apparatus 500 goes to step S1805. On the other hand, if the specific basic word appearance map M1 has not been set (step S1803: NO), the information generating apparatus 500 sets the specific basic word appearance map M1 for the longest matching basic word (step S1804) and goes to step S1805.

For example, the information generating apparatus 500 registers the longest matching basic word as a specific basic word for a specific basic word item of the specific basic word appearance map M1 and sets zero in the bit string for all the file numbers. Subsequently, at step S1805, the information generating apparatus 500 turns on the bit of the object file Fi in the specific basic word appearance map M1 for the longest matching basic word (step S1805).

The information generating apparatus 500 terminates the specific basic word appearance map generation process (step S1702) and goes to the specific single character appearance map generation process (step S1703). With this specific basic word appearance map generation process (step S1702), the map can be generated with the longest matching basic word defined as a basic word for each object character.

Figure 19:
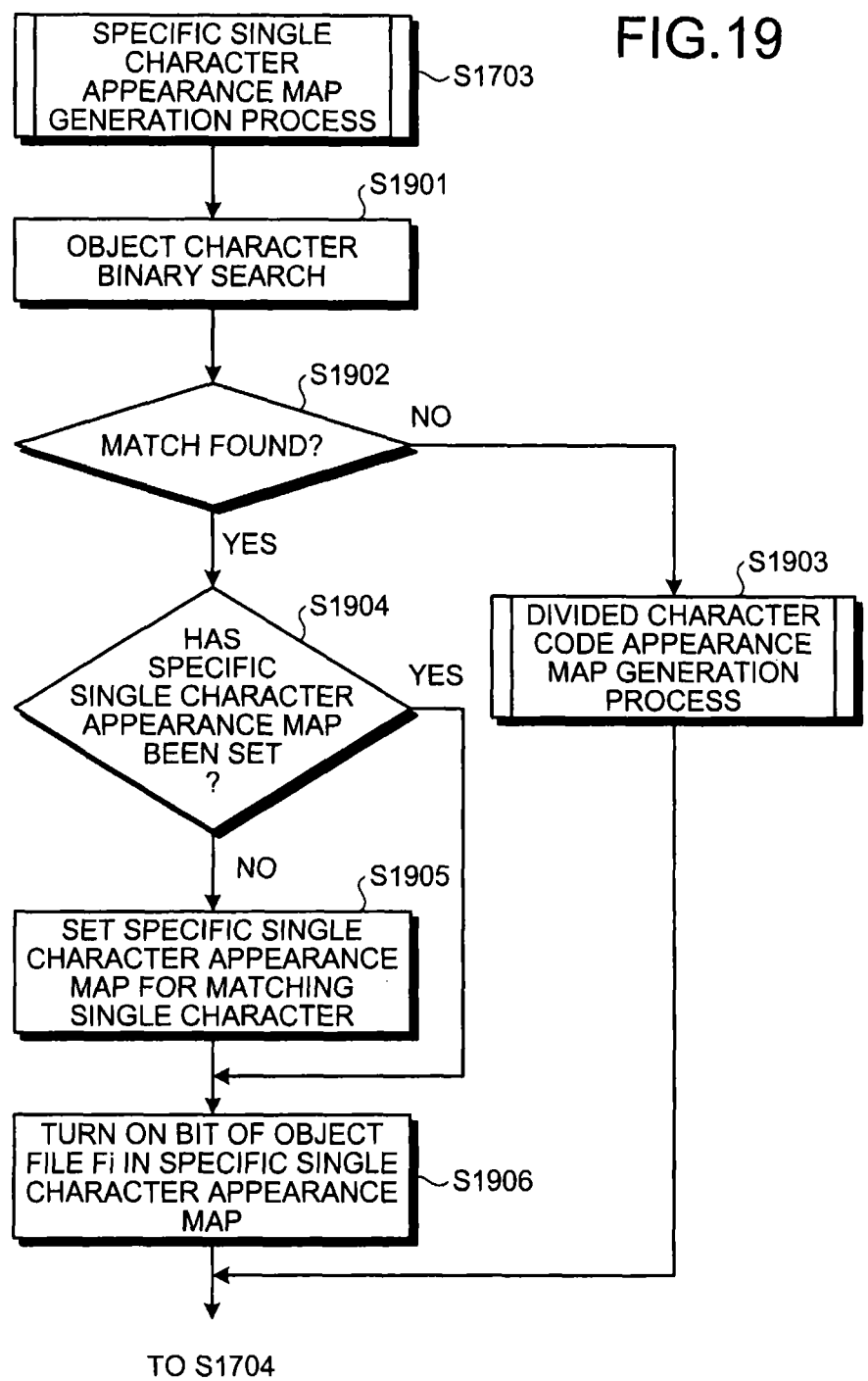
FIG. 19 is a flowchart of a detailed process procedure of a specific single character appearance map generation process (step S1703) depicted in FIG. 17.

FIG. 19 is a flowchart of a detailed process procedure of the specific single character appearance map generation process (step S1703) depicted in FIG. 17. First, the information generating apparatus 500 performs a binary search of the single character structure for the object character (step S1901) and determines whether a match is found (S1902). If no matching single character exists (step S1902: NO), the information generating apparatus 500 executes a divided character code appearance map generation process (step S1903) and goes to the multi-character string appearance map generation process (step S1704). Details of the divided character code appearance map generation process (step S1903) will be described later.

On the other hand, at step S1902, if a single character matching the object character exists based on the results of the binary search (step S1902: YES), the information generating apparatus 500 determines whether the specific single character appearance map M2 has been set for the binary-searched object character (step S1904). If the specific single character appearance map M2 has been set (step S1904: YES), the information generating apparatus 500 goes to step S1906. On the other hand, if the specific single character appearance map M2 has not been set (step S1904: NO), the information generating apparatus 500 sets the specific single character appearance map M2 for the retrieved single character (step S1905) and goes to step S1906.

For example, the information generating apparatus 500 registers the binary-searched single character as a specific single character for a specific single character item of the specific single character appearance map M2 and sets zero in the bit string for all the file numbers. Subsequently, at step S1906, the information generating apparatus 500 turns on the bit of the object file Fi in the specific single character appearance map M2 for the binary-searched single character (step S1906).

The information generating apparatus 500 then terminates the specific single character appearance map generation process (step S1703) and goes to the multi-character string appearance map generation process (step S1704). With this specific single character appearance map generation process (step S1703), the map can be generated with the binary-searched single character defined as a specific single character.

Figure 20:
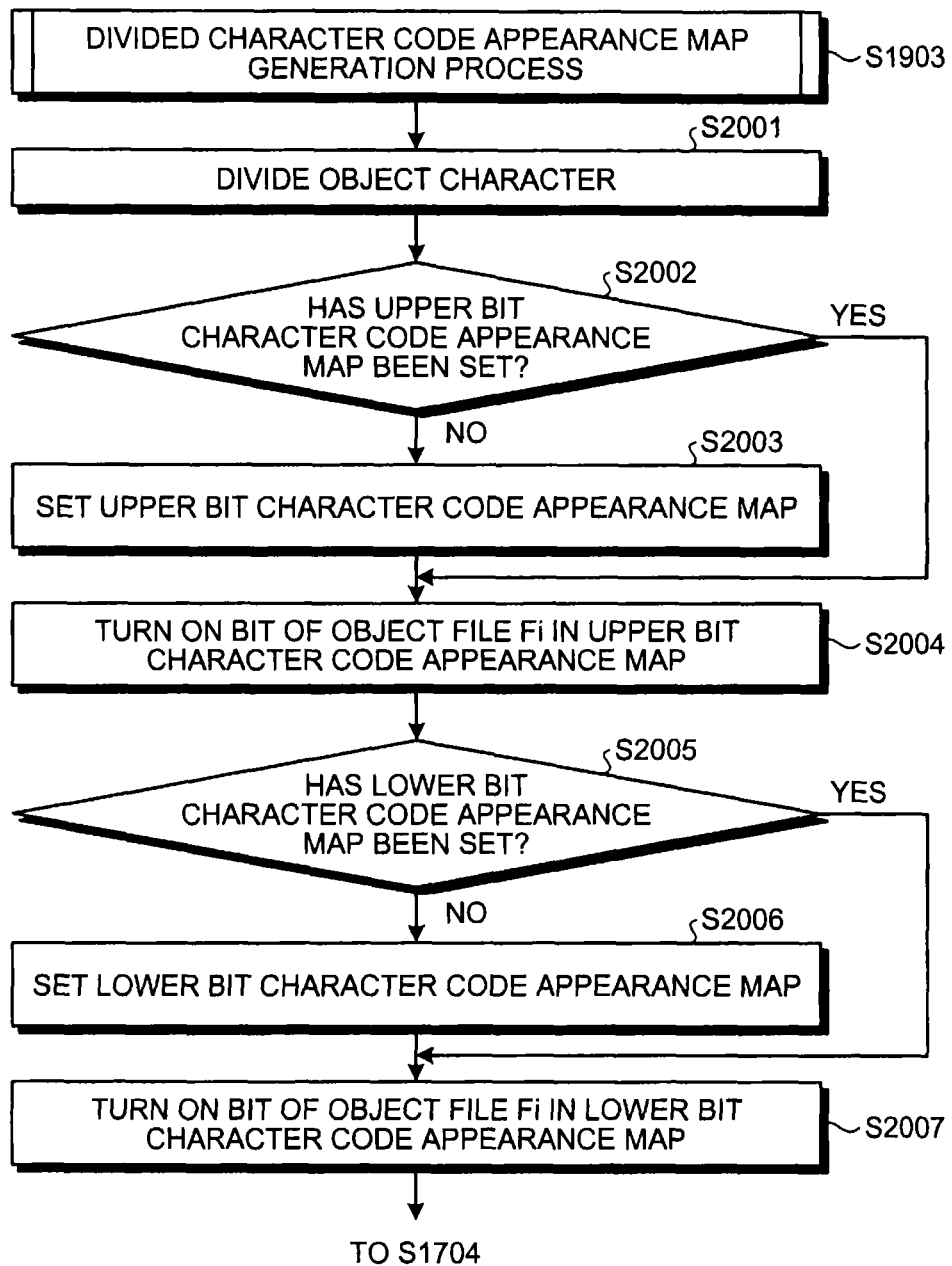
FIG. 20 is a flowchart of a detailed process procedure of a divided character code appearance map generation process (step S1903) depicted in FIG. 19.

FIG. 20 is a flowchart of a detailed process procedure of the divided character code appearance map generation process (step S1903) depicted in FIG. 19. First, the information generating apparatus 500 divides the object character (step S2001) and determines whether the upper bit character code appearance map M3 has been set for an upper bit character code divided from the object character (step S2002). If the upper bit character code appearance map M3 has been set (step S2002: YES), the information generating apparatus 500 goes to step S2004. On the other hand, if the upper bit character code appearance map M3 has not been set (step S2002: NO), the information generating apparatus 500 sets the upper bit character code appearance map M3 for the upper bit character code divided from the object character (step S2003) and goes to step S2004.

For example, the information generating apparatus 500 registers the upper bit character code divided from the object character for an upper bit character code item of the upper bit character code appearance map M3 and sets zero in the bit string for all the file numbers. Subsequently, at step S2004, the information generating apparatus 500 turns on the bit of the object file Fi in the upper bit character code appearance map M3 for the upper bit character code divided from the object character (step S2004).

The information generating apparatus 500 determines whether the lower bit character code appearance map M4 has been set for a lower bit character code divided from the object character (step S2005). If the lower bit character code appearance map M4 has been set (step S2005: YES), the information generating apparatus 500 goes to step S2007. On the other hand, if the lower bit character code appearance map M4 has not been set (step S2005: NO), the information generating apparatus 500 sets the lower bit character code appearance map M4 for the lower bit character code divided from the object character (step S2006) and goes to step S2007.

For example, the information generating apparatus 500 registers the lower bit character code divided from the object character for a lower bit character code item of the lower bit character code appearance map M4 and sets zero in the bit string for all the file numbers. Subsequently, at step S2007, the information generating apparatus 500 turns on the bit of the object file Fi in the lower bit character code appearance map M4 for the lower bit character code divided from the object character (step S2007).

The information generating apparatus 500 then terminates the divided character code appearance map generation process (step S1903) and goes to the multi-character string appearance map generation process (step S1704). With regard to this divided character code appearance map generation process (step S1903), for single characters ranked lower than the rank corresponding to the target appearance rate Pc, a large number of OFF bits appears due to lower appearance frequency.

However, the exclusion from the generation of the specific single character appearance map M2 enables optimization of the map size of the specific single character appearance map M2. The single characters ranked lower than the rank corresponding to the target appearance rate Pc are divided and set in maps having fixed map sizes such as the upper bit character code appearance map M3 and the lower bit character code appearance map M4. Therefore, since no change is made in the upper bit character code appearance map M3 and the lower bit character code appearance map M4 regardless of an appearance rate set as the target appearance rate Pc, the map sizes can be prevented from increasing and a memory can be saved.

Figure 21:
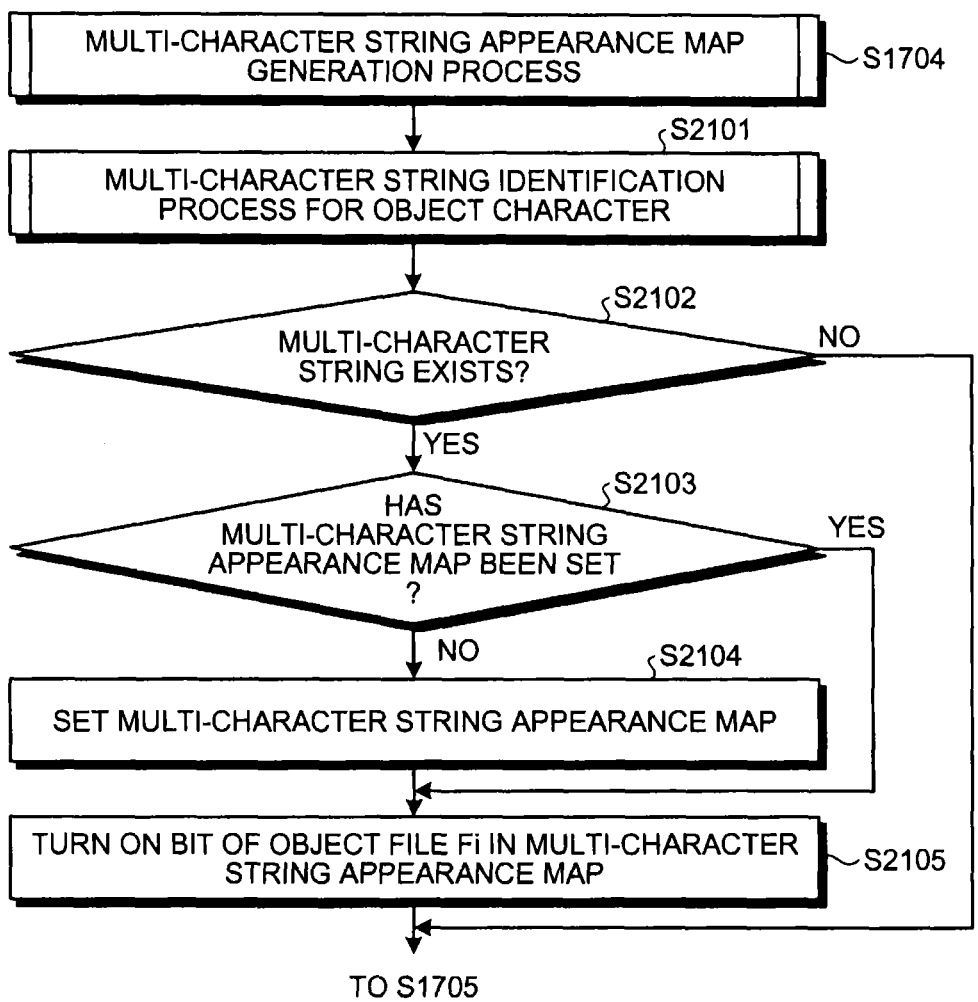
FIG. 21 is a flowchart of a detailed process procedure of a multi-character string appearance map generation process (step S1704) depicted in FIG. 17.

FIG. 21 is a flowchart of a detailed process procedure of the multi-character string appearance map generation process (step S1704) depicted in FIG. 17. First, the information generating apparatus 500 executes a multi-character string identification process for the object character (step S2101). Details of the multi-character string identification process (step S2101) will be described later. After the multi-character string identification process (step S2101), if no multi-character string related to the object character exists (step S2102: NO), the information generating apparatus 500 goes to step S1705.

On the other hand, if a multi-character string related to the object character exists (step S2102: YES), the information generating apparatus 500 determines whether the multi-character string appearance map M5 has been set for the multi-character string related to the object character (step S2103). If the multi-character string appearance map M5 has been set (step S2103: YES), the information generating apparatus 500 goes to step S2105. On the other hand, if the multi-character string appearance map M5 has not been set (step S2103: NO), the information generating apparatus 500 sets the multi-character string appearance map M5 for the multi-character string related to the object character (step S2104) and goes to step S2105.

For example, the information generating apparatus 500 registers the multi-character string related to the object character for a multi-character string item of the multi-character string appearance map M5 and sets zero in the bit string for all the file numbers. Subsequently, at step S2105, the information generating apparatus 500 turns on the bit of the object file Fi in the multi-character string appearance map M5 for the multi-character string related to the object character (step S2105). The information generating apparatus 500 then terminates the multi-character string appearance map generation process (step S1704) and goes to step S1705. With the multi-character string appearance map generation process (step S1704), the map can be generated for each multi-character string related to the object character.

Figure 22:
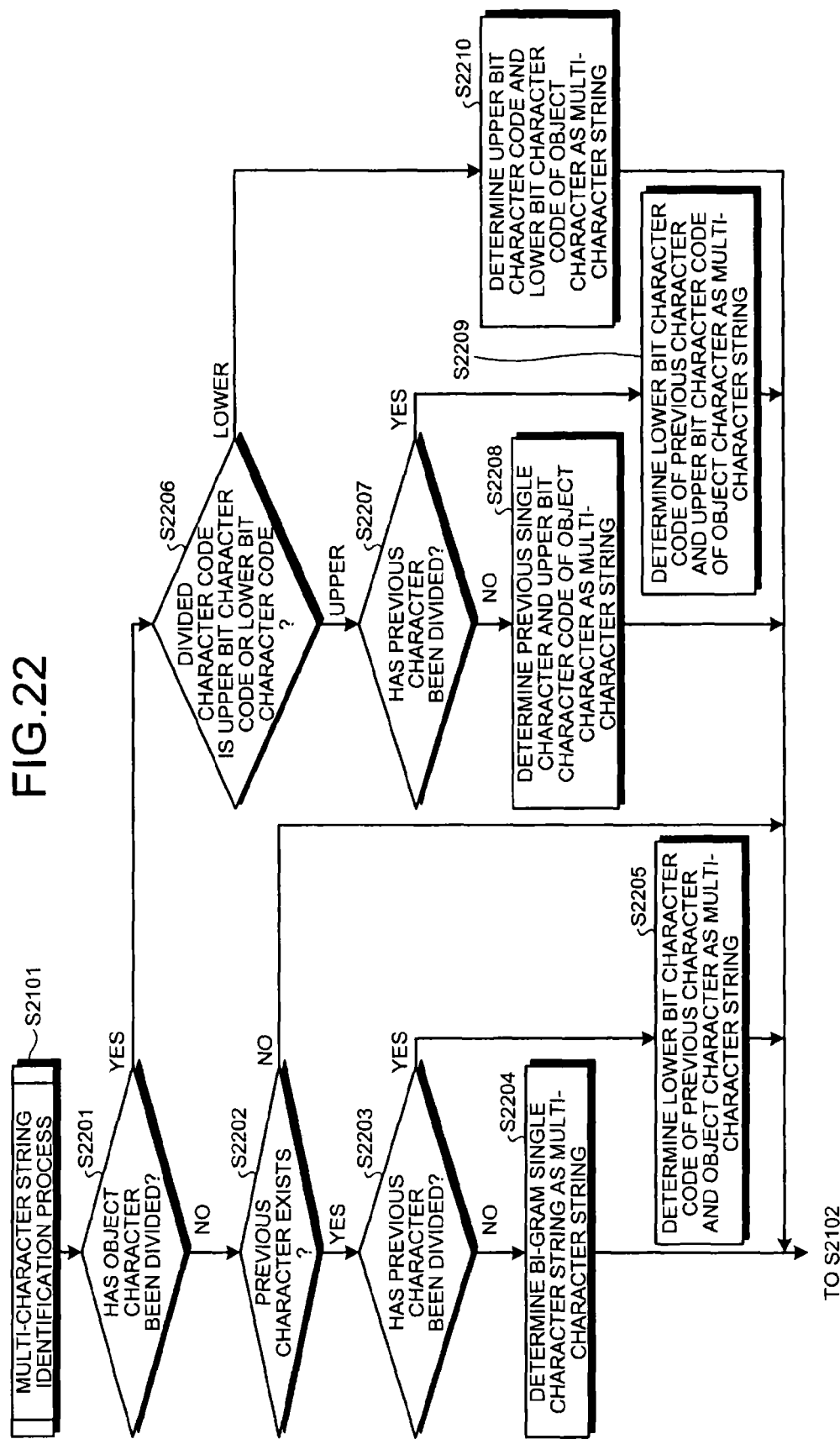
FIG. 22 is a flowchart of a detailed process procedure of a multi-character string identification process (step S2101) depicted in FIG. 21.

FIG. 22 is a flowchart of a detailed process procedure of the multi-character string identification process (step S2101) depicted in FIG. 21. First, for the object character, the information generating apparatus 500 determines whether the object character has been divided (step S2201). In other words, the information generating apparatus 500 determines whether the object character is a divided character code. If the object character has not been divided (step S2201: NO), i.e., in the case of a single character, the information generating apparatus 500 determines whether the previous character exists (step S2202).

If the previous character exists (step S2202: YES), the information generating apparatus 500 determines whether the previous character has been divided (step S2203). In other words, the information generating apparatus 500 determines whether the previous character is a divided character code. If the previous character has not been divided (step S2203: NO), i.e., in the case of a single character, the information generating apparatus 500 determines a character string made up of the previous single character before the object character and the object character (single character) as a multi-character string (step S2204). The information generating apparatus 500 goes to step S2102.

On the other hand, at step S2203, if the previous character has been divided (step S2203: NO), i.e., in the case of a divided character code, the divided character code, i.e., the previous character, is a lower bit character code. Therefore, the information generating apparatus 500 determines a character string made up of the lower bit character code, which is the previous character, and the object character as a multi-character string (step S2205). The information generating apparatus 500 goes to step S2102.

At step S2202, if no previous character exists (step S2202: NO), only the object character exists and therefore, the information generating apparatus 500 goes to step S2102 without determining a multi-character string.

At step S2201, if the object character is divided (step S2201: YES), i.e., in the case of a divided character code, the information generating apparatus 500 determines whether the divided character code is an upper bit character code or a lower bit character code (step S2206).

In the case of the upper bit character code (step S2206: UPPER), the information generating apparatus 500 determines whether the previous character has been divided (step S2207). In other words, it is determined whether the previous character is a divided character code. If the previous character has not been divided (step S2207: NO), i.e., in the case of a single character, the information generating apparatus 500 determines a character string made up of the previous single character before the object character and the upper bit character code divided from the object character as a multi-character string (step S2208). The information generating apparatus 500 goes to step S2102.

On the other hand, at step S2207, if the previous character has been divided (step S2207: YES), i.e., in the case of a divided character code, the divided character code, i.e., the previous character, is a lower bit character code. Therefore, the information generating apparatus 500 determines a character string made up of the lower bit character code, which is the previous character, and the upper bit character code divided from the object character as a multi-character string (step S2209). The information generating apparatus 500 goes to step S2102.

At step S2206, in the case of the lower bit character code (step S2206: LOWER), the information generating apparatus 500 determines a character string bit consisting of the upper bit character code and the lower bit character code divided from the object character as a multi-character string (step S2210). The information generating apparatus 500 goes to step S2102.

With the multi-character string identification process (step S2101), a multi-character string can be identified even if the object character is divided. Since the multi-character strings are identified by shifting characters one-by-one, the map can simultaneously be generated in parallel with the specific basic word appearance map M1 and the specific single character appearance map M2.

With the information generation described above, since the numbers of basic words and single characters associated with the map generation are limited by the target appearance rates Pw and Pc, wasteful map generation is eliminated, and the acceleration of the map generation and the optimization of the map size can be realized at the same time. The generation of different types of maps can simultaneously be executed in parallel by shifting characters one-by-one, and the different types of maps used in highly accurate search can more efficiently be generated.

The information search program, the information search apparatus, and the information search method will be described. In the information search program, the information search apparatus, and the information search method, a search is performed by using various maps generated in the information generating program, the information generating apparatus, and the information generating method. An exemplary hardware configuration of the information search apparatus is the same as the exemplary hardware configuration depicted in FIG. 4. The information search apparatus may be a computer integrated with or separated from the information generating apparatus 500.

FIG. 23 is a block diagram of an example of a functional configuration of the information search apparatus. An information search apparatus 2300 includes an input unit 2301, a dividing unit 2302, a file identifying unit 2303, a narrowing-down unit 2304, a search unit 2305, and an output unit 2306. For example, the functions of the input unit 2301 to the output unit 2306 are implemented by the CPU 401 executing programs stored in a storage device such as the ROM 402, the RAM 403, the magnetic disk 405, and the optical disk 407 depicted in FIG. 4, or by the I/F 409.

The input unit 2301 receives input of a search character string. For example, the input of a search character string is received via operation of an input device such as the keyboard 410 and the mouse 411.

Among the single characters making up the search character string, the dividing unit 2302 divides the character code of a single character that does not correspond to a specific single character into divided character code, including upper bit character code and lower bit character code. For example, the dividing unit 2302 divides a character code of a single character that does not correspond to a specific single character registered as a specific single character item in the specific single character appearance map M2 described above into an upper bit character code and a lower bit character code.

The file identifying unit 2303 refers to index information indicating the presence/absence of specific designated words in each object file and identifies from among designated words present in the object file group F in which character strings are described and among the ranks in descending order up to the target appearance rate for the designated words, an object file that includes the search character string. For example, the file identifying unit 2303 identifies an object file that includes the search character string by referring to the specific basic word appearance map M1 described above.

The file identifying unit 2303 refers to index information indicating the presence/absence of specific single characters in each object file and identifies from among single characters present in the object file group F in which character strings are described and among the ranks in descending order up to the target appearance rate for the single characters, an object file that includes each single character making up the search character string. For example, the file identifying unit 2303 identifies an object file that includes the search character string by referring to the specific single character appearance map M2 described above.

The file identifying unit 2303 identifies an object file that includes an upper bit character code by referring to index information that indicates for each object file, the presence/absence of the upper bit character code obtained by the dividing unit 2302. For example, the file identifying unit 2303 refers to the upper bit character code appearance map M3 described above and identifies an object file that includes an upper bit character code obtained by the dividing unit 2302.

Similarly, the file identifying unit 2303 identifies an object file that includes lower bits by referring to index information indicating in each object file, the presence of lower bits obtained by the dividing unit 2302. For example, the file identifying unit 2303 refers to the lower bit character code appearance map M4 described above and identifies an object file that includes a lower bit character code obtained by the dividing unit 2302.

The file identifying unit 2303 refers to index information indicating the presence/absence of multi-character strings in each object file and identifies for each multi-character string that is a sequence of single characters among single characters present in the object file group F and among the ranks in descending order up to the target appearance rate for the single characters, an object file that includes each multi-character string making up the search character string. For example, the file identifying unit 2303 identifies an object file that includes each multi-character string making up the search character string by referring to the multi-character string appearance map M5 described above.

The file identifying unit 2303 refers to index information indicating the presence/absence of multi-character strings in each object file for each multi-character string that is a sequence of specific single characters and identifies from among single characters present in the object file group F and among the ranks in descending order up to the target appearance rate, an object file that includes a multi-character string that is a sequence of a specific single character and an upper bit character code making up the search character string. For example, the file identifying unit 2303 identifies an object file that includes each multi-character string making up the search character string by referring to the multi-character string appearance map M5 described above.

The file identifying unit 2303 identifies for each multi-character string that is a sequence of lower bits and a specific single character among single characters present in the object file group F and among the ranks in descending order up to the target appearance rate for the single characters, an object file that includes the multi-character string, by referring to index information indicating the presence/absence of multi-character strings in each object file. For example, the file identifying unit 2303 identifies an object file that includes each multi-character string making up the search character string by referring to the multi-character string appearance map M5 described above.

The file identifying unit 2303 refers to index information indicating the presence/absence of multi-character strings in each object file and identifies for each multi-character string that is a sequence of upper bits and lower bits, an object file that includes the multi-character string. For example, the file identifying unit 2303 identifies an object file that includes each multi-character string making up the search character string by referring to the multi-character string appearance map M5 described above.

The narrowing-down unit 2304 narrows down the object file group F identified by the file identifying unit 2303 to the object files that include all of the single characters making up the search character string. For example, the narrowing-down unit 2304 narrows down the object files identified by the file identifying unit 2303 to the object files having the bits turned on for all the single characters making up the search character string in the specific single character appearance map M2.

The narrowing-down unit 2304 narrows down the object file group F identified by the file identifying unit 2303 to the object files that include all of the single characters and the multi-character strings making up the search character string. For example, the narrowing-down unit 2304 narrows down the object files identified by the file identifying unit 2303 to the object files having the bits turned on for all the specific single characters making up the search character string in the specific single character appearance map M2 and having the bits turned on for all the multi-character strings making up the search character string in the multi-character string appearance map M5.

The narrowing-down unit 2304 narrows down the object file group F identified by the file identifying unit 2303 to the object files that include all of the single characters, the upper bit character codes, the lower bit character codes, and the multi-character strings making up the search character string.

For example, the narrowing-down unit 2304 narrows down the object files identified by the file identifying unit 2303 to the object files having the bits turned on for all the specific single characters making up the search character string in the specific single character appearance map M2, having the bits turned on for all the upper bit character codes making up the search character string in the upper bit character code appearance map M3, having the bits turned on for all the lower bit character codes making up the search character string in the lower bit character code appearance map M4, and having the bits turned on for all the multi-character strings making up the search character string in the multi-character string appearance map M5.

The search unit 2305 refers to the specific basic word appearance map M1 and searches for information related to the search character string in the object files identified by the file identifying unit 2303. For example, if the search character string corresponds to a specific basic word, the search unit 2305 refers to the specific basic word appearance map M1 and searches for a character string matching the search character string from the identified object files. If the search character string does not correspond to a specific basic word, the search unit 2305 searches the object files narrowed down by the narrowing-down unit 2304, for a character string matching the search character string.

The output unit 2306 outputs a search result obtained by the search unit 2305. For example, the output unit 2306 performs display output of the search result on a display, performs print output of the search result, verbally reads the search result, stores the search result into a storage device, and/or transmits the search result to an external device.

The search result is output as a character string matching the search character string or is output as information related to the character string matching the search character string. For the related information, for example, if the character string matching the search character string is an entry word of a dictionary, descriptive text is output. Conversely, if the character string matching the search character string is a character string in a descriptive text of a dictionary, the entry word of the descriptive text may be output.

An example of the information search process will be described.

FIG. 24 is an explanatory diagram of an example (part 1) of the information search process. In FIG. 24, it is assumed that a search character string is "結婚活動". The search character string "結婚活動" includes specific basic words "結婚" and "活動". Therefore, an AND operation is performed for the specific basic word appearance map M2 of "結婚" and "活動" depicted in FIG. 24. The object files are identified that have the file numbers turned to ON (1) in an AND result of this AND operation. In the case of FIG. 24, the object files F3 and Fn are likely to include the search character string "結婚活動".

FIG. 25 is an explanatory diagram of an example (part 2) of the information search process. In FIG. 25, it is assumed that a search character string is "婚活". The search character string "婚活" includes specific single characters "婚" and "活". A two-character string "婚活" also included. No specific basic word is included.

Therefore, an AND operation is performed for the specific single character appearance map M2 and the multi-character string appearance map M5 depicted in FIG. 25. The object file is identified that has the file number turned to ON (1) in an AND result of this AND operation. In the case of FIG. 25, the object file Fn includes the search character string "婚活". The object file Fn is likely to include a character string (e.g., "結婚活動") including "婚活" and therefore, the deterioration of search performance due to so-called parting can be prevented.

FIG. 26 is an explanatory diagram of an example (part 3) of the information search process. In FIG. 26, it is assumed that a search character string is "脱藩". Since the single characters "脱" and "藩" in the search character string "脱藩" are not specific single characters, the search character string includes the upper bit character code "0x81" and the lower bit character code "0x31" of the single character "脱" and the upper bit character code "0xE9" and the lower bit character code "0x85" of the single character "藩". The search character string includes two-character strings "0x81 0x31", "0x31 0xE9", and "0xE9 0x85". No specific basic word is included in the search character string "脱藩".

Therefore, an AND operation is performed for the upper bit character code appearance map M3, the lower bit character code appearance map M4, and the multi-character string appearance map M5 depicted in FIG. 26. The object file is identified that has the file number turned to ON (1) in an AND result of this AND operation. In the case of FIG. 26, the object file Fn is likely to include the search character string "脱藩".

FIG. 27 is an explanatory diagram of an example (part 4) of the information search process. In FIG. 27, it is assumed that a search character string is "離脱". Although the single character "離" of the search character string "離脱" is a specific single character, "脱" is not a specific single character. Therefore, the search character string "離脱" includes the specific single character "離" and the upper bit character code "0x81" and the lower bit character code "0x31" of the single character "脱". The search character string includes two-character strings "離 0x81" and "0x81 0x31". No specific basic word is included in the search character string "離脱".

Therefore, an AND operation is performed for the specific single character appearance map M2, the upper bit character code appearance map M3, the lower bit character code appearance map M4, and the multi-character string appearance map M5 depicted in FIG. 27. The object file is identified that has the file number turned to ON (1) in an AND result of this AND operation. In the case of FIG. 27, the object file Fn is likely to include the search character string "離脱".

FIG. 28 is an explanatory diagram of an example (part 5) of the information search process. In FIG. 28, it is assumed that a search character string is "脱出". Although the single character "出" of the search character string "脱出" is a specific single character, "脱" is not a specific single character. Therefore, the search character string "脱出" includes the specific single character "出" and the upper bit character code "0x81" and the lower bit character code "0x31" of the single character "脱". The search character string includes two-character strings "0x81 0x31" and "0x31 出". No specific basic word is included in the search character string "脱出".

Therefore, an AND operation is performed for the specific single character appearance map M2, the upper bit character code appearance map M3, the lower bit character code appearance map M4, and the multi-character string appearance map M5 depicted in FIG. 28. The object file is identified that has the file number turned to ON (1) in an AND result of this AND operation. In the case of FIG. 28, the object file Fn is likely to include the search character string "脱出".

FIG. 29 is an explanatory diagram of an example (part 6) of the information search process. In FIG. 29, it is assumed that search character strings are "is" and "a" and that a search condition is AND. The search character string "is" includes the specific basic word "is" (substantive verb) and the search character string "a" includes the specific basic word "a" (indefinite article). These search character strings enable a search for a sentence of the so-called is-a construction. Therefore, an AND operation is performed for the specific basic word appearance map M1 of "is" and "a" depicted in FIG. 29. The object files are identified that have the file numbers turned to ON (1) in an AND result of this AND operation. In the case of FIG. 29, the object files F3 and Fn includes the search character strings "is" and "a".

FIG. 30 is an explanatory diagram of an example (part 7) of the information search process. In FIG. 30, it is assumed that a search character string is "tern". The search character string "tern" includes two-character strings "te", "er", and "rn". Therefore, the object file is identified that has the file number turned to ON (1) in the two-character string appearance map M5 depicted in FIG. 30. In the case of FIG. 30, the object file Fn includes the search character string "tern".

FIG. 31 is a flowchart of an information search process procedure of the information search apparatus 2300. First, the information search apparatus 2300 waits for input of a search character string group (including one search character string) to the input unit 2301 (step S3101: NO) and, if the search character string group is input (step S3101: YES), the information search apparatus 2300 determines whether an unselected search character string exists (step S3102). If an unselected search character string exists (step S3102: YES), the information search apparatus 2300 selects one unselected search character string (step S3103), executes a file identification process (step S3104), and returns to step S3102.

On the other hand, if no unselected search character string exists (step S3102: NO), the information search apparatus 2300 determines a search condition (step S3105). If the search condition is AND (step S3105: AND), the information search apparatus 2300 uses an AND operation to narrow down and set the object files identified for each search character string as search object files (step S3106) and goes to step S3108. On the other hand, if the search result is OR (step S3105: OR), the information search apparatus 2300 uses an OR operation to narrow down and set the object files identified for each search character string as search object files (step S3107) and goes to step S3108.

At step S3108, a search is performed for each of the search object files according to the search condition (step S3108). An output process of outputting a search result is executed (step S3109) and the information search process is terminated.

Figure 32A:
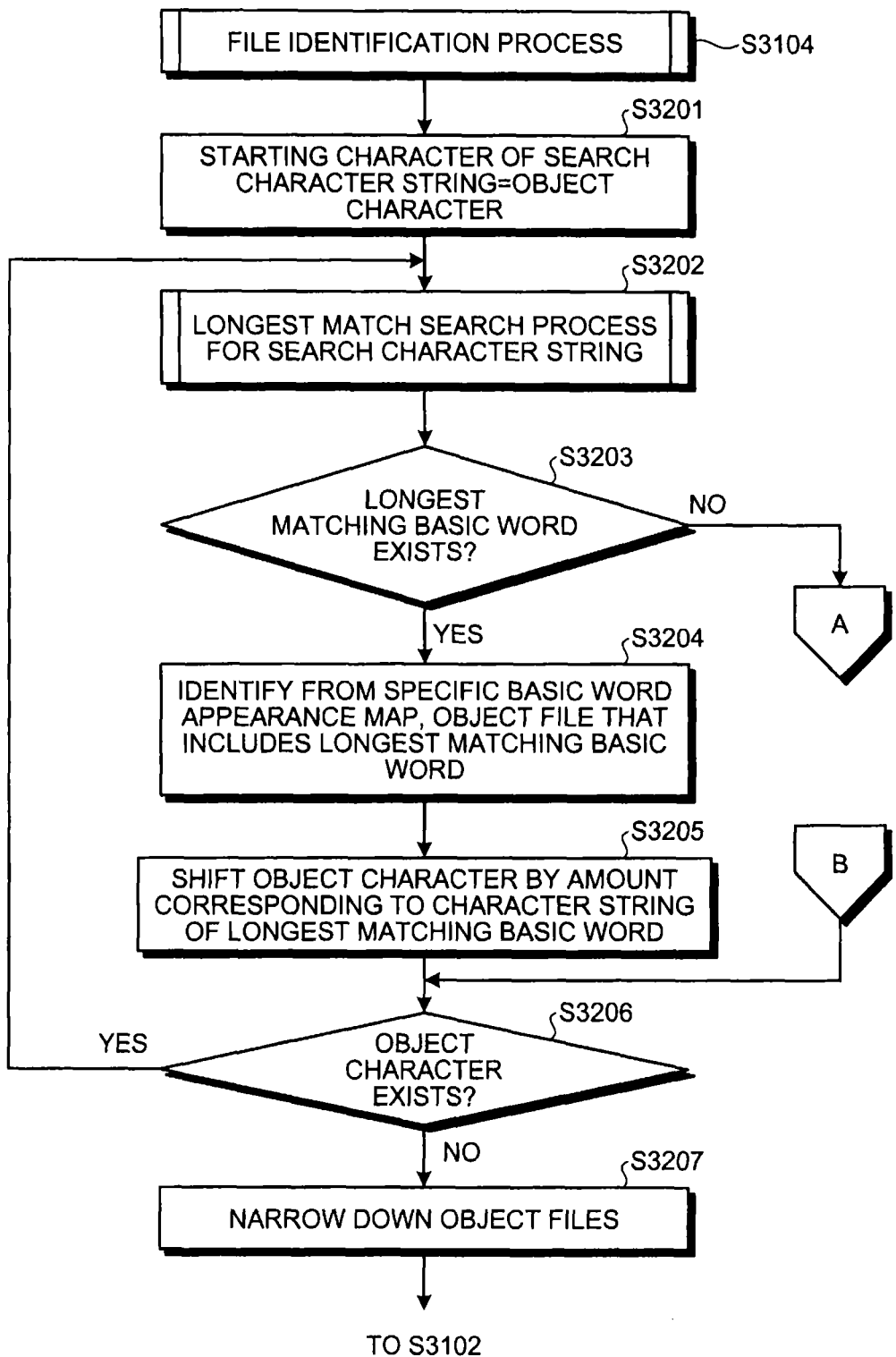
FIG. 32A is a flowchart (part 1) of a detailed process procedure of a file identification process (step S3104) depicted in FIG. 31.

FIG. 32A is a flowchart (part 1) of a detailed process procedure of the file identification process (step S3104) depicted in FIG. 31. First, the information search apparatus 2300 sets a starting character of a search character string as the object character (step S3201) and executes a longest match search process for the search character string (step S3202). Details of the longest match search process of the search character string (step S3202) will be described later.

The information search apparatus 2300 determines whether a longest matching basic word exists, based on a result of the longest match search process of the search character string (step S3202) (step S3203). If no longest matching basic word exists (step S3203: NO), the information search apparatus 2300 goes to step S3211 of FIG. 32B. On the other hand, if a longest matching basic word exists (step S3203: YES), the information search apparatus 2300 identifies an object file that includes the longest matching basic word from the specific basic word appearance map M1 (step S3204). For example, the information search apparatus 2300 identifies an object file having a bit turned on for the longest matching basic word, i.e., the specific basic word.

The information search apparatus 2300 then shifts the object character by an amount corresponding to the character string of the longest matching basic word (step S3205), and determines whether the object character exists (step S3206). If the object character exists (step S3206: YES), the information search apparatus 2300 returns to step S3202. On the other hand, no object character exists (step S3206: NO), the information search apparatus 2300 uses the narrowing-down unit 2304 to perform an AND operation to narrow down the object files identified up to step S3206 (step S3207). The information search apparatus 2300 returns to step S3102.

FIG. 32B is a flowchart (part 2) of a detailed process procedure of the file identification process (step S3104) depicted in FIG. 31. At step S3203 of FIG. 32A, if no longest matching basic word exists (step S3203: NO), in FIG. 32B, the information search apparatus 2300 determines whether the object character is a specific single character (step S3211). For example, the information search apparatus 2300 determines whether the object character is registered as a specific single character item in the specific single character appearance map M2.

If the object character is a specific single character (step S3211: YES), the information search apparatus 2300 identifies an object file that includes the object character from the specific single character appearance map M2 (step S3212). For example, the information search apparatus 2300 identifies an object file having a bit turned on for the object character and goes to step S3216.

On the other hand, if the object character is not a specific single character at step S3211 (step S3211: NO), the information search apparatus 2300 divides the object character into an upper bit character code and a lower bit character code (step S3213). The information search apparatus 2300 identifies an object file that includes the upper bit character code of the single character, from the upper bit character code appearance map M3 (step S3214). For example, the information search apparatus 2300 identifies an object file having a bit turned on for the upper bit character code. Similarly, the information search apparatus 2300 identifies an object file that includes the lower bit character code of the single character, from the lower bit character code appearance map M4 (step S3215). For example, the information search apparatus 2300 identifies an object file having a bit turned on for the lower bit character code. The information search apparatus 2300 goes to step S3216.

At step S3216, the information search apparatus 2300 executes a file identification process using the multi-character string appearance map M5 (step S3216). Details of the file identification process using the multi-character string appearance map M5 (step S3216) will be described later. The information search apparatus 2300 then shifts the object character by one character (step S3217) and goes to step S3206 of FIG. 32A.

With this file identification process (step S3104), if the search character string includes a specific basic word, the object files can be narrowed down by the specific basic word appearance map M1 and, if not including a specific basic word, the object files can be narrowed down and identified by the AND operation of the specific single character appearance map M2, the upper bit character code appearance map M3, the lower bit character code appearance map M4, and the multi-character string appearance map M5.

Figure 33:
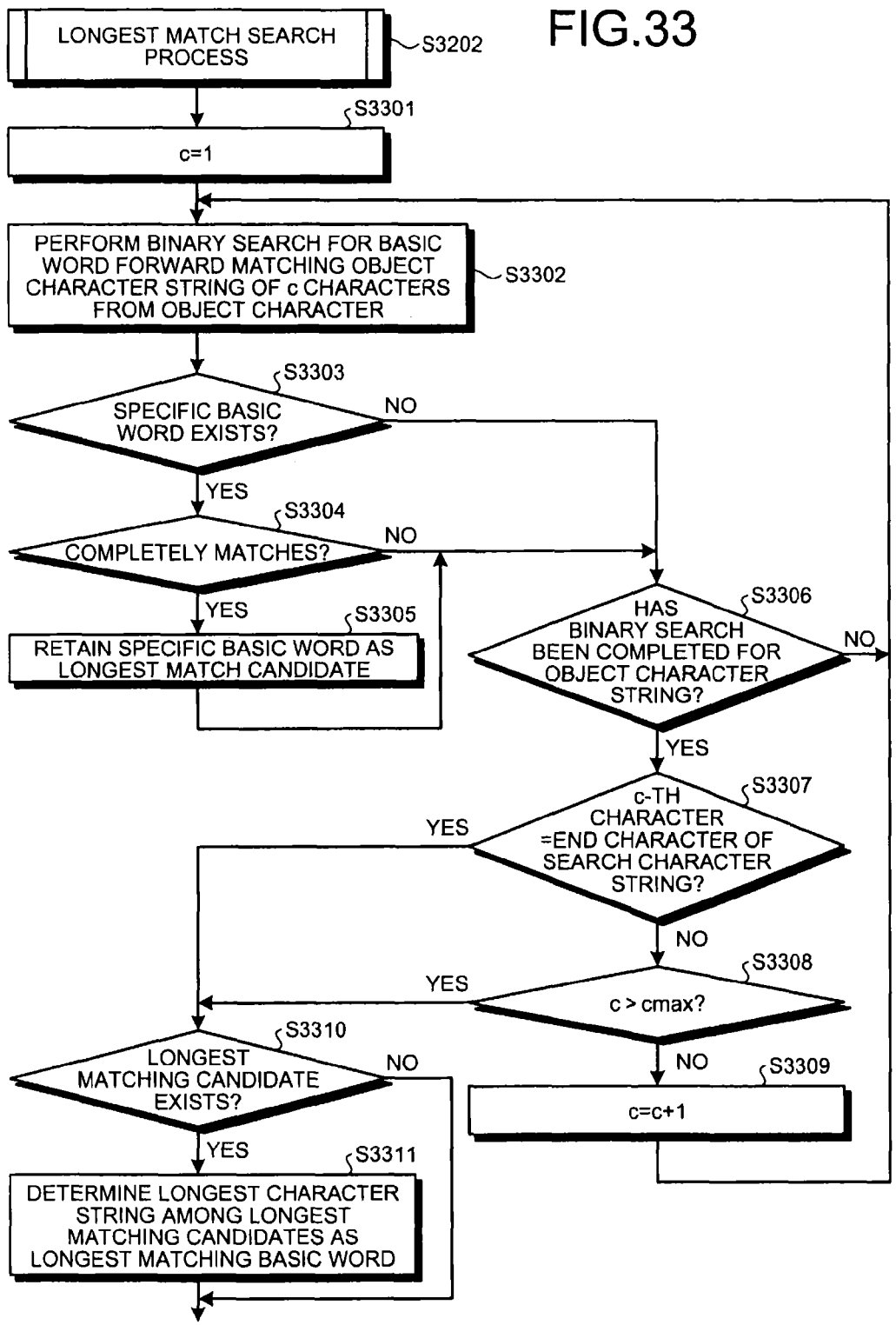
FIG. 33 is a flowchart of a detailed process procedure of a longest match search process (step S3202) depicted in FIG. 32B.

FIG. 33 is a flowchart of a detailed process procedure of the longest match search process (step S3202) depicted in FIG. 32B. First, the information search apparatus 2300 sets c=1 (step S3301). C is the number of characters from the object character (including the object character). C=1 means only the object character. The information search apparatus 2300 then performs a binary search for a basic word forward matching an object character string of c characters from the object character (step S3302). An object to be searched for in this case is a specific basic word group registered as the specific basic word items of the specific basic word appearance map M1.

The information search apparatus 2300 determines whether a specific basic word exists, based on a result of the binary search (step S3303). If no specific basic word is hit as a result of the binary search (step S3303: NO), the information search apparatus 2300 goes to step S3306.

On the other hand, if a specific basic word is hit as a result of the binary search (step S3303: YES), the information search apparatus 2300 determines whether the hit specific basic word completely matches the object character string (step S3304). If the designated basic word does not completely match (step S3304: NO), the information search apparatus 2300 goes to step S3306. On the other hand, if the designated basic word completely matches (step S3304: YES), the information search apparatus 2300 retains in a storage device, the specific basic word as a longest match candidate (step S3305) and goes to step S3306.

At step S3306, the information search apparatus 2300 determines whether the binary search has been completed for the object character string (step S3306). For example, the information search apparatus 2300 determines whether the binary search has been performed for the last specific basic word. If the binary search has not been completed (step S3606: NO), the information search apparatus 2300 goes to step S3302 and continues until the binary search is completed.

On the other hand, if the binary search has been completed for the object character string (step S3306: YES), the information search apparatus 2300 determines whether a c-th character is the end character of the search character string (step S3307). If the c-th character is the end character of the search character string (step S3307: YES), the information search apparatus 2300 goes to step S3310. On the other hand, if the c-th character is not the end character of the search character string (step S3307: NO), the information search apparatus 2300 determines whether c>cmax is satisfied (step S3308). Cmax is a value preliminarily set as the upper limit number of characters of the object character string.

If c>cmax is not satisfied (step S3308: NO), the information search apparatus 2300 increments c (step S3309) and returns to step S3302. On the other hand, if c>cmax is satisfied (step S3308: YES), the information search apparatus 2300 determines whether a longest matching candidate exists (step S3310). For example, the information search apparatus 2300 determines whether at least one longest matching candidate is retained in the storage device at step S3305.

If longest matching candidates exist (step S3310: YES), the information search apparatus 2300 determines the longest character string among the longest matching candidates as the longest matching basic word (step S3311). The information search apparatus 2300 then goes to step S3202. On the other hand, if no longest matching candidate exists at step S3310 (step S3310: NO), the information search apparatus 2300 goes to step S3203.

As a result, the longest match search process (step S3202) is terminated. With this longest match search process (step S3202), the longest character string of the completely matching character strings can be searched as a specific basic word from the specific basic word group registered in the specific basic word appearance map M1.

Figure 34:
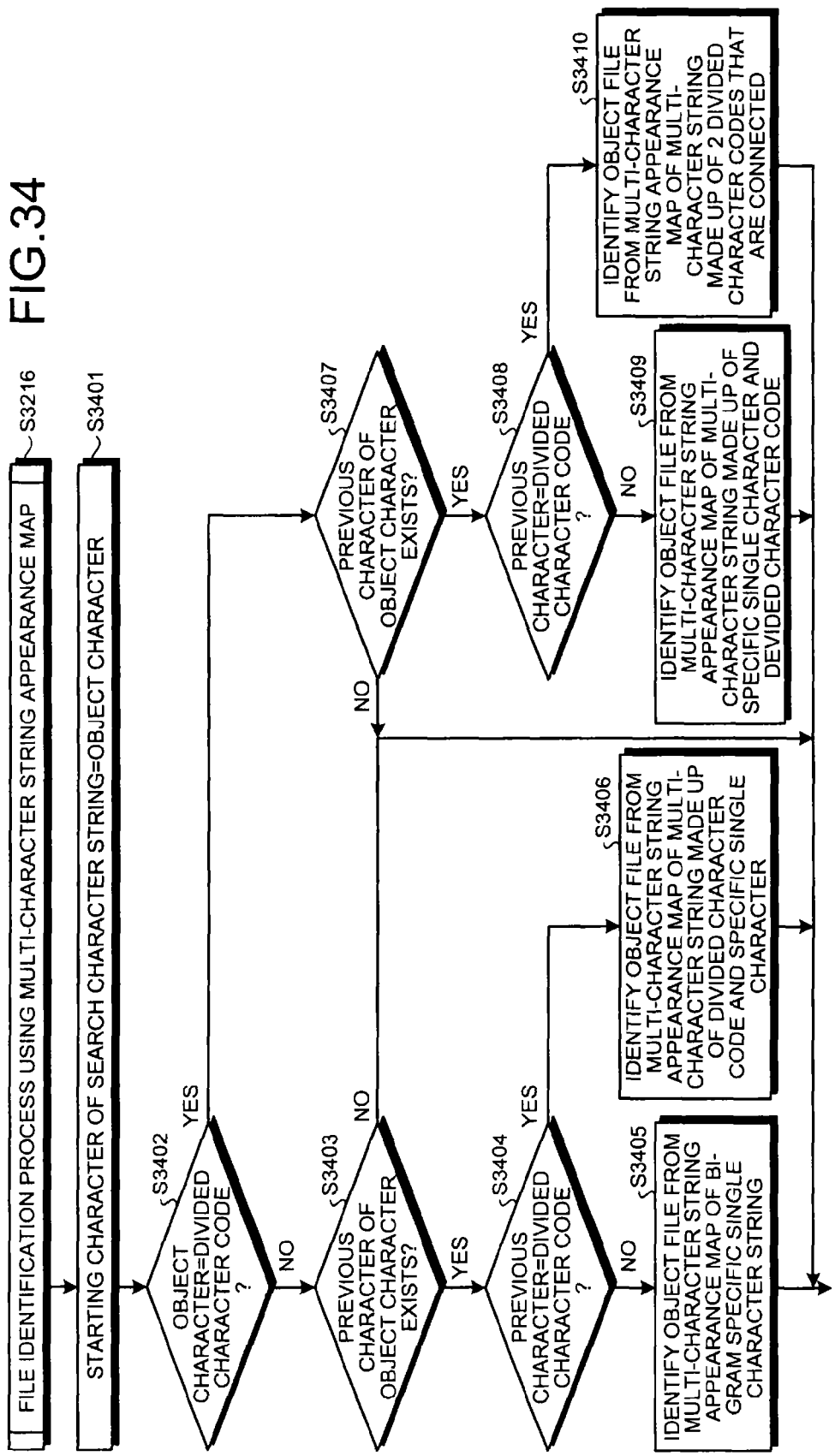
FIG. 34 is a flowchart of a detailed process procedure of a file identification process using a multi-character string appearance map M5 (step S3216) depicted in FIG. 32B.

FIG. 34 is a flowchart of a detailed process procedure of the file identification process using the multi-character string appearance map M5 (step S3216) depicted in FIG. 32B. First, the information search apparatus 2300 defines a starting character of a search character string as the object character (step S3401). In this search character string, a divided character code is handled as one character if the character is divided into divided character codes.

The information search apparatus 2300 determines whether the object character is a divided character code (step S3402). If the object character is not a divided character code (step S3402: NO), the information search apparatus 2300 determines whether the previous character of the object character exists (step S3403). For example, if the object character is a lower bit character code, the previous character is an upper bit character code. If the object character is a specific single character or an upper bit character code, the previous character is a lower bit character code given that a character is divided immediately before the object character.

If the previous character exists (step S3403: YES), the information search apparatus 2300 determines whether the previous character is a divided character code (step S3404). If the previous character is not a divided character code (step S3404: NO), the information search apparatus 2300 identifies an object file from the multi-character string appearance map M5 of a bi-gram specific single character string (step S3405). For example, the information search apparatus 2300 identifies an object file having a bit turned on for a bi-gram specific single character string and goes to step S3217.

On the other hand, at step S3404, if the previous character is a divided character code (step S3404: YES), the information search apparatus 2300 identifies an object file from the multi-character string appearance map M5 of a multi-character string made up of a divided character code and a specific single character (step S3406). For example, the information search apparatus 2300 identifies an object file having a bit turned on for a multi-character string made up of a divided character code and a specific single character and goes to step S3217.

On the other hand, at step S3403, if no previous character of the object character exists (step S3403: NO), the information search apparatus 2300 goes to step S3217 without identifying an object file.

If the object character is a divided character code (step S3402: YES), the information search apparatus 2300 determines whether the previous character of the object character exists (step S3407).

If the previous character exists (step S3407: YES), the information search apparatus 2300 determines whether the previous character is a divided character code (step S3408). If the previous character is not a divided character code (step S3408: NO), the information search apparatus 2300 identifies an object file from the multi-character string appearance map M5 of a multi-character string made up of a specific single character and an upper bit character code (step S3409). For example, the information search apparatus 2300 identifies an object file having a bit turned on for a multi-character string made up of a specific single character and an upper bit character code and goes to step S3217.

On the other hand, at step S3408, if the previous character is a divided character code (step S3408: YES), the information search apparatus 2300 identifies an object file from the multi-character string appearance map M5 of a multi-character string made up of two divided character codes that are connected (step S3410). For example, the information search apparatus 2300 identifies an object file having a bit turned on for a multi-character string made up of two connected divided character codes and goes to step S3217.

At step S3407, if no previous character of the object character exists (step S3407: NO), the information search apparatus 2300 goes to step S3217 without identifying an object file.

With this file identification process of the multi-character string appearance map M5 (step S3216), an object file can be identified that has a multi-character string made up only of specific single characters, a multi-character string made up only of divided character codes, or a connection character code made up of a mixture of a specific single character and a divided character code present in the search character string.

As described above, according to the information search described above, if a specific basic word exists in a search character string, an object file can be identified from the specific basic word appearance map M1 and therefore, a high-speed search process can be realized. Even if no specific basic word exists in the search character string, object files can efficiently be narrowed down by using the specific single character appearance map M2, the upper bit character code appearance map M3, the lower bit character code appearance map M4, and the multi-character string appearance map M5. For example, a new clipped word such as "嬌活" is not registered as a specific basic word and, in such a case, object files can be narrowed down.

Map projection will be described. With regard to the map projection, an object file may newly be added to the object file group F. In such a case, the phases (A) to (D) are performed as depicted in FIGS. 1 to 3 for the added object file. The map projection refers to a process of generating bit lines for the added object file in the specific basic word appearance map M1, the specific single character appearance map M2, the upper bit character code appearance map M3, the lower bit character code appearance map M4, and the multi-character string appearance map M5.

FIG. 35 is an explanatory diagram of the map projection. In FIG. 35, the specific basic word appearance map M1 is taken as an example for the description. In (A), a segment S1 is a bitmap made up of the specific basic word group and the object files F1 to Fn corresponding to the initial object file group F.

If a predetermined number of added object files are accumulated, a new segment is set. In FIG. 35, for example, a segment S2 is set as a new segment if n object files are added when n is the same number as the segment S1. The number may not be the same as the segment S1.

(B) depicts a state after the segment S2 is set. (C) depicts a state when an object file is newly added with bit lines generated for the added object file. As depicted in (D), a bitmap can be generated with the specific basic word appearance map M1 made up of the specific basic word group and the segments S1 to SN.

Figure 36:
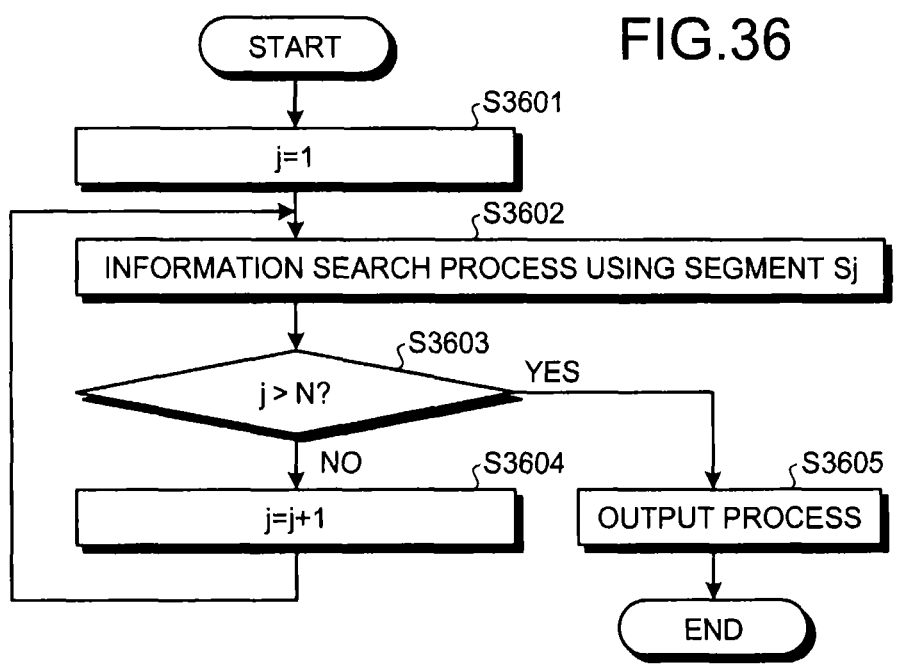
FIG. 36 is a flowchart of an information search process procedure when using appearance maps segmented into multiple pieces due to addition of object files.

FIG. 36 is a flowchart of an information search process procedure when using appearance maps segmented into multiple pieces due to addition of object files. First, the information search apparatus 2300 sets a segment number j as j=1 (step S3601) and executes an information search process using a segment Sj (step S3602). In this information search process (step S3602), step S3101 to step S3108 depicted in FIG. 31 are executed. Therefore, the file identification process (step S3104) depicted in FIGS. 32A and 32B and the longest match search process (step S3202) depicted in FIG. 33 are also executed. However, a partially different process is included in FIG. 32B and will therefore be descried with reference to FIG. 37.

The information search apparatus 2300 determines whether j>N is satisfied (step S3603). If j>N is not satisfied (step S3603: NO), the information search apparatus 2300 increments j to specify the next segment Sj (step S3604) and returns to step S3602. On the other hand, if j>N is satisfied at step S3603 (step S3603: YES), the information search apparatus 2300 executes an output process by the output unit 2306 (step S3605). At this step, search results using the segments S1 to SN are output.

Figure 37:
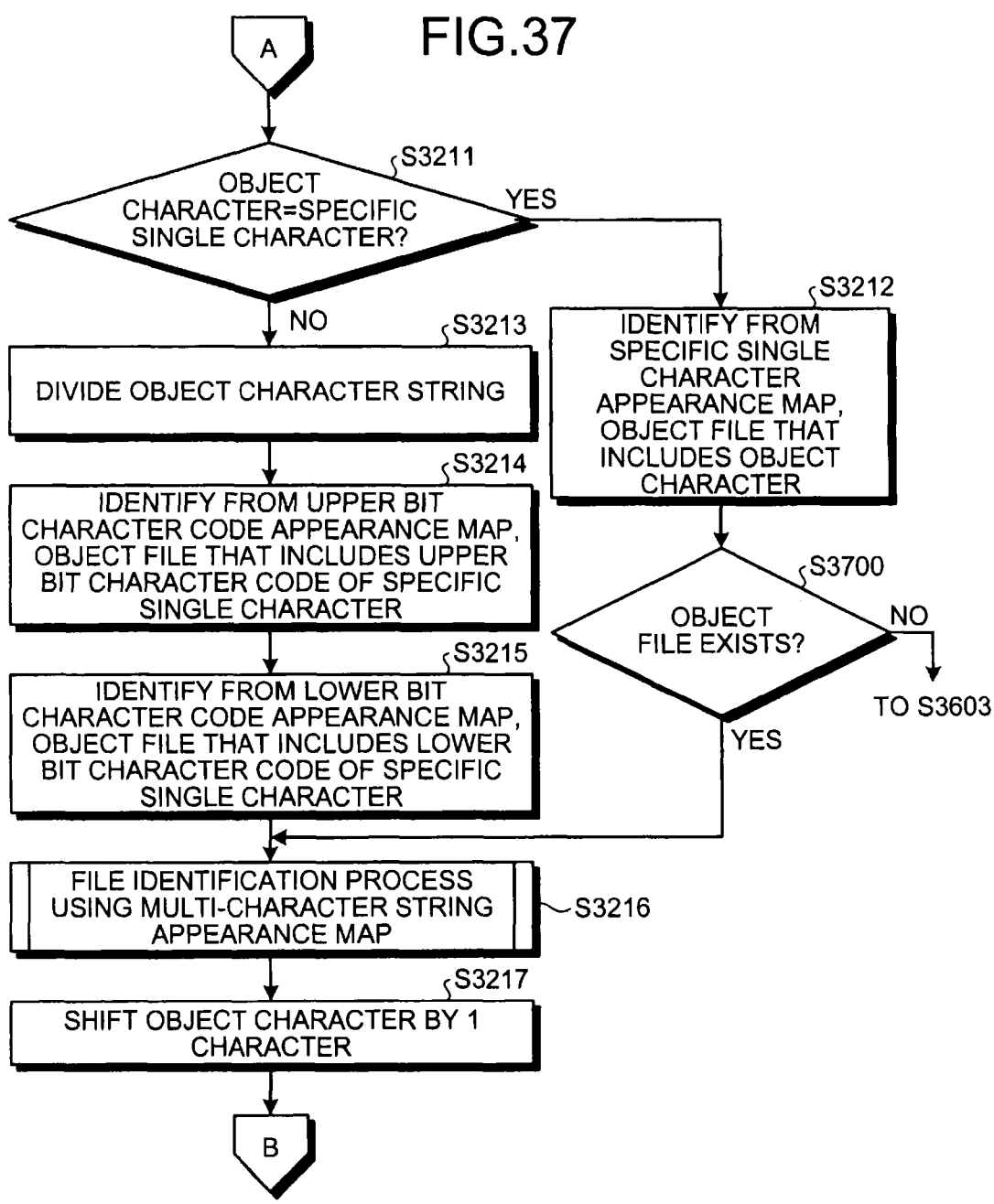
FIG. 37 is a flowchart of a portion of the file identification process (step S3104) in the information search process (step S3602) depicted in FIG. 36.

FIG. 37 is a flowchart of a portion of the file identification process (step S3104) in the information search process (step S3602) depicted in FIG. 36. In FIG. 37, the steps identical to those in FIG. 32B are denoted by the same step numbers and will not be described. In FIG. 37, at step S3212, it is determined whether an object file in the segment Sj exists that can be identified as the file at step S3212 (step S3700).

If an object file in the segment Sj exists that can be identified as the file (step S3700: YES), the information search apparatus 2300 goes to step S3216. On the other hand, if no object file in the segment Sj exists that can be identified as the file (step S3700: NO), the information search apparatus 2300 goes to step S3603. In other words, when the segment Sj does not have an object file that includes a specific single character that is the object character, even if a file can be identified by setting the subsequent characters as the object file, no object file is acquired by narrowing down files at step S3207.

Therefore, if no object file can be identified for one character, the information search apparatus 2300 goes to step S3603 and specifies the next segment Sj, thereby skipping useless searches and accelerating the search speed.

As described above, according to the information generating program, the information generating apparatus, and the information generating method, the index information indicating the presence/absence of basic words and characters can be accelerated and the size of the index information can be optimized. According to the information search program, the information search apparatus, and the information search method, search noise can be reduced.

The methods described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The information generating program, the information generating apparatus, and the information generating method enable faster generation of index information indicating the presence/absence of basic words and characters and optimization of the size of the index information. The information search program, the information search apparatus, and the information search method effect reductions in search noise.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing therein an information generating program that causes a computer to execute a process comprising:
    obtaining a word appearance frequency information related to an appearance frequency of each word belonging to a basic word group, and a single character appearance frequency information related to an appearance frequency of each single character belonging to a designated single character group, wherein the appearance frequency of each word or each single character indicates an appearance frequency thereof in an object file group;
    extracting a plurality of specific words from the basic word group based on the word appearance frequency information;
    extracting a plurality of specific single characters from the designated single character group based on the single character appearance frequency information;
    dividing a character code of each single character that is included in the designated single character group but not included in the specific single characters, into upper bits of a divided character code and lower bits of the divided character code; and
    generating for the object file group:
        first index information indicating for each file the presence/absence of each specific word,
        second index information indicating for each file the presence/absence of each specific single character,
        third index information indicating for each file the presence/absence of each single character including the upper bits of the divided character code, and
        fourth index information indicating for each file the presence/absence of each single character including the lower bits of the divided character code.

2. The non-transitory computer-readable recording medium according to claim 1, wherein the process further comprising:
    receiving an input of a search character group;
    identifying an object file that includes the search character group by referring to the first index information;
    retrieving information related to the search character group from the identified object file; and
    outputting a result of the retrieving.

3. An apparatus, comprising:
    at least one computer processor; and
    at least one non-transitory computer-readable recording medium storing therein at least one information generating program that causes the at least one computer processor to execute:
        obtaining a word appearance frequency information related to an appearance frequency of each word belonging to a basic word group, and a single character appearance frequency information related to an appearance frequency of each single character belonging to a designated single character group, wherein the appearance frequency of each word or each single character indicates an appearance frequency thereof in an object file group;
        extracting a plurality of specific words from the basic word group based on the word appearance frequency information;
        extracting a plurality of specific single characters from the designated single character group based on the single character appearance frequency information;
        dividing a character code of each single character that is included in the designated single character group but not included in the specific single characters, into upper bits of a divided character code and lower bits of the divided character code; and
        generating for the object file group:
            first index information indicating for each file the presence/absence of each specific word,
            second index information indicating for each file the presence/absence of each specific single character,
            third index information indicating for each file the presence/absence of each single character including the upper bits of the divided character code, and
            fourth index information indicating for each file the presence/absence of each single character including the lower bits of the divided character code.

4. The apparatus according to claim 3, wherein the at least one computer processor further executes:
    receiving an input of a search character group;
    identifying an object file that includes the search character group by referring to the first index information;
    retrieving information related to the search character group from the identified object file; and
    outputting a result of the retrieving.

5. A method, comprising:
    performing, by at least one apparatus:
        obtaining a word appearance frequency information related to an appearance frequency of each word belonging to a basic word group, and a single character appearance frequency information related to an appearance frequency of each single character belonging to a designated single character group, wherein the appearance frequency of each word or each single character indicates an appearance frequency thereof in an object file group;
        extracting a plurality of specific words from the basic word group based on the word appearance frequency information;
        extracting a plurality of specific single characters from the designated single character group based on the single character appearance frequency information;
        dividing a character code of each single character that is included in the designated single character group but not included in the specific single characters, into upper bits of a divided character code and lower bits of the divided character code; and
        generating for the object file group:
            first index information indicating for each file the presence/absence of each specific word,
            second index information indicating for each file the presence/absence of each specific single character,
            third index information indicating for each file the presence/absence of each single character including the upper bits of the divided character code, and
            fourth index information indicating for each file the presence/absence of each single character including the lower bits of the divided character code.

6. The method according to claim 5, wherein the at least one apparatus further performs:

receiving an input of a search character group;
identifying an object file that includes the search character group by referring to the first index information;
retrieving information related to the search character group from the identified object file; and
outputting an result of the retrieving.

\* \* \* \* \*